(12) United States Patent
Li

(10) Patent No.: US 7,184,396 B1
(45) Date of Patent: Feb. 27, 2007

(54) SYSTEM, DEVICE, AND METHOD FOR BRIDGING NETWORK TRAFFIC

(75) Inventor: Yunzhou Li, Lowell, MA (US)

(73) Assignee: Nortel Networks Limited (CA)

(*) Notice: Subject to any disclaimer, the term of this patent is extended or adjusted under 35 U.S.C. 154(b) by 840 days.

(21) Appl. No.: 09/668,219

(22) Filed: Sep. 22, 2000

(51) Int. Cl.
*H04L 12/26* (2006.01)

(52) U.S. Cl. ...................... 370/225; 370/242

(58) Field of Classification Search ........... 370/217, 370/218, 220, 225, 242, 244, 245, 254, 389, 370/400, 401, 402, 226, 227, 228
See application file for complete search history.

(56) References Cited

U.S. PATENT DOCUMENTS

| | | | | |
|---|---|---|---|---|
| 6,167,025 | A * | 12/2000 | Hsing et al. | 370/216 |
| 6,392,989 | B1 * | 5/2002 | Jardetzky et al. | 370/216 |
| 6,600,724 | B1 * | 7/2003 | Cheng | 370/256 |
| 6,678,274 | B1 * | 1/2004 | Walia et al. | 370/395.52 |
| 2002/0004843 | A1 * | 1/2002 | Andersson et al. | 709/238 |
| 2002/0093954 | A1 * | 7/2002 | Weil et al. | 370/389 |
| 2002/0181485 | A1 * | 12/2002 | Cao et al. | 370/419 |
| 2004/0042402 | A1 * | 3/2004 | Galand et al. | 370/237 |
| 2005/0076231 | A1 * | 4/2005 | Ichinohe et al. | 713/200 |

* cited by examiner

*Primary Examiner*—Chi Pham
*Assistant Examiner*—Anh-Vu Ly
(74) *Attorney, Agent, or Firm*—McGuinness & Manaras LLP

(57) ABSTRACT

A system, device, and method for bridging network traffic between a first communication interface and a second communication interface uses a pre-computed bridged routing table to enable a bridge to be established quickly. The pre-computed bridged routing table includes the second communication interface as an outgoing interface in each routing table entry having the first communication interface as an outgoing interface. The bridged routing table is pre-computed for the pair of communication interfaces by searching a main routing table for all main routing table entries having the first communication interface as an outgoing interface and creating, for each such main routing table entry, a corresponding bridged routing table entry including all outgoing interfaces from the main routing table entry and additionally including the second (bridged) communication interface as an outgoing interface. Bridged routing tables may be pre-computed for multiple potential communication interface pairs.

33 Claims, 27 Drawing Sheets

Figure 4B  Main Routing Vector  440

Figure 5A  Bridged Routing Table [Slot 1, Slot 2]

Figure 5B  Bridged Routing Vector [Slot 1, Slot 2]  540

Figure 6A    Bridged Routing Table [Slot 5, Slot 6]

Figure 6B Bridged Routing Vector [Slot 5, Slot 6]   640

Figure 7A  Bridged Routing Table [Slot7, Slot 8]

Figure 7B Bridged Routing Vector [Slot 7, Slot 8] 740

Figure 8A   Bridged Routing Table [Slot 9, Slot A]

Figure 8B  Bridged Routing Vector [Slot 9, Slot A]   840

Figure 9A  Bridged Routing Table [Slot 9, Slot E]

Figure 9B  Bridged Routing Vector [Slot 9, Slot E]   940

Figure 10A Bridged Routing Table [Slot 5, Slot E]

Figure 10B Bridged Routing Vector [Slot 5, Slot E]  1040

Figure 11A  Bridged Routing Table [Slot7, Slot E]

Figure 11B  Bridged Routing Vector [Slot 7, Slot E]   1140

Figure 12A  Bridged Routing Table [Slot 9, Slot E]

Figure 12B  Bridged Routing Vector [Slot 9, Slot E]  1240

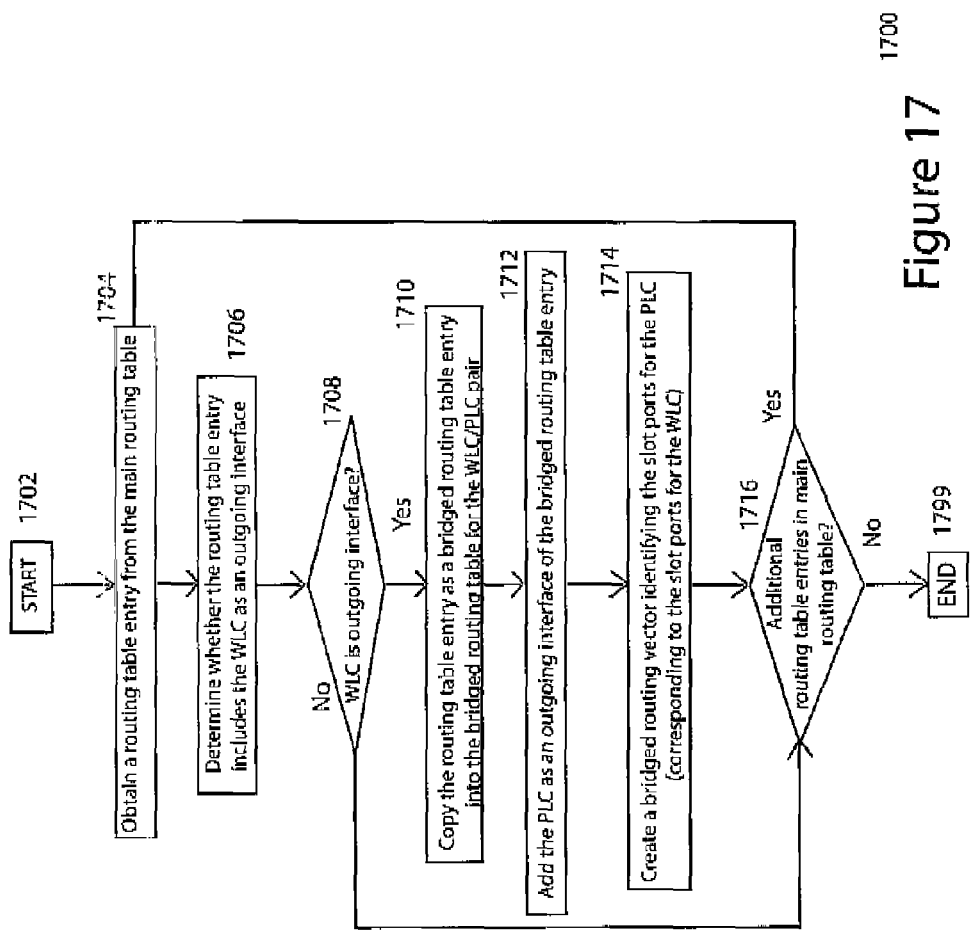

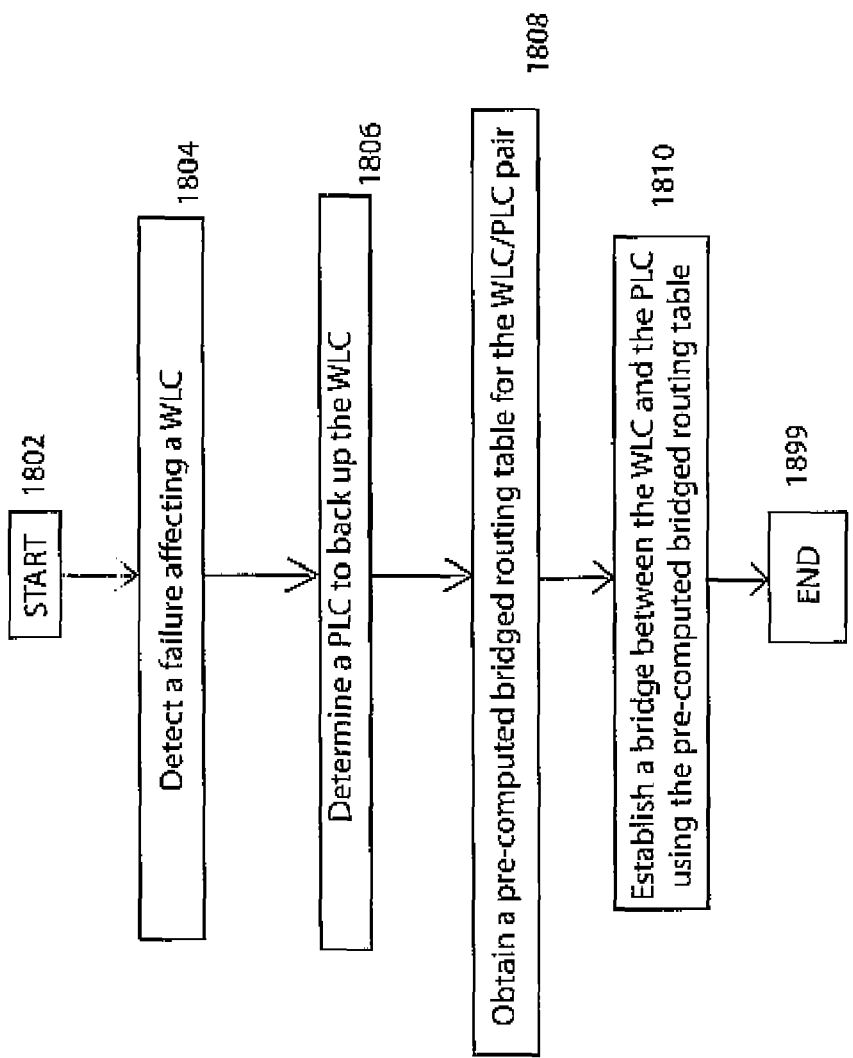

SYSTEM, DEVICE, AND METHOD FOR BRIDGING NETWORK TRAFFIC

CROSS-REFERENCE TO RELATED APPLICATIONS

The present patent application may be related to the following commonly owned United States patent applications, which are hereby incorporated herein by reference in their entireties:

U.S. patent application Ser. No. 09/648,273 entitled A MECHANISM FOR AUTOMATIC PROTECTION SWITCHING IN A ROUTER, which was filed on Aug. 25, 2000 in the names of Dan Adamski, David Benson, Bilel Jamoussi, Yunzhou Li, and Jagannath Shantigram; and U.S. patent application Ser. No. 09/668,220 entitled APPARATUS AND METHOD FOR SUPPORTING MULTIPLE REDUNDANCY MECHANISMS, which was filed on even date herewith in the name of Yunzhou Li.

FIELD OF THE INVENTION

The present invention relates generally to communication systems, and more particularly to bridging network traffic in a communication system.

BACKGROUND OF THE INVENTION

In today's information age, computers and computer peripherals are frequently interconnected over a communication network. A typical communication network includes a number of networking devices, such as switches and routers. These networking devices work together to route packets of information from a source device to one or more destination devices.

A typical networking device includes a number of line cards. Each line card occupies a "slot" of the networking device, and supports one or more network interfaces (each referred to hereinafter as a "slot port") through which the networking device communicates with various other devices, including other networking devices. Exemplary slot port types include Ethernet and SONET.

Within the networking device, the line cards are interconnected by a switching fabric. Each line card includes one or more fabric interfaces (each referred to hereinafter as a "fabric port"). Among other things, the fabric ports on a particular line card may be used for supporting different types of fabric services (e.g., unicast versus multicast fabric ports) and/or for supporting priority queues (e.g., high priority versus low priority fabric ports). The switching fabric routes information between the line cards, and more particularly between fabric ports.

Each line card includes logic for receiving, processing, and transmitting packets. Each line card can receive and transmit packets over its fabric port(s) and over its slot port(s). Each line card maintains a routing table that is typically distributed to all line cards by a central controller. The routing table includes a number of routing table entries, where each routing table entry indicates, among other things, the outgoing interface(s) associated with a particular destination. An outgoing interface can be a slot port on the same line card as indicated by a slot port number, a different line card as indicated by a slot number, or a specific fabric port on a different line card as indicated by a slot number/fabric port number pair.

The line cards interoperate over the switching fabric in order to route packets. Specifically, a packet received by a particular line card (referred to hereinafter as the "incoming line card") over a particular slot port may be forwarded to other slot ports on the same line card and/or to other line cards. The incoming line card uses its routing table to determine the outgoing interfaces for the packet, typically based upon a destination address or label in the packet, and forwards the packet over the outgoing interface(s).

In certain applications, two line cards are "bridged" so that all packets sent to a first line card (referred to hereinafter as a "working line card" or "WLC") over the switching fabric are also sent to a second line card (referred to hereinafter as the "protection line card" or "PLC"). Among other things, a bridge may be used for redundancy or protection switching. In a typical embodiment, bridging is accomplished by modifying the routing table to include the PLC as an outgoing interface in all routing table entries having the WLC as an outgoing interface. For convenience, each such routing table entry is referred to hereinafter as a "bridged routing table entry." With a bridge in place, any packet that is sent to the WLC is also sent to the PLC.

When used for redundancy, both the WLC and the PLC typically have active connections to a common destination, and the bridge forwards packets to both the WLC and the PLC so that the packets are sent over both connections to the common destination. The destination receives the same packets over both connections, and therefore the destination can obtain packets from either connection. In this application, the bridge is considered to be a permanent bridge in that the bridge must be maintained at all times in order for redundancy to be maintained.

When used for protection switching, the PLC is typically a backup line card that is activated when communication over the WLC fails, either from a connection failure or a failure of the WLC itself. In this application, the bridge may be a permanent bridge or a temporary bridge. A permanent bridge is typically established before detecting the failure so that packets are already being sent to the PLC when the failure is detected. In this case, protection switching can be completed by simply activating the PLC upon detecting the failure. A temporary bridge is typically established dynamically after detecting the failure so that packets are not sent to the PLC until after the failure is detected. In this case, protection switching requires both establishment of the bridge and activation of the PLC.

A temporary bridge may be used for applications in which a permanent bridge is either undesirable or impractical. For example, a temporary bridge may be required when the PLC is used as a backup for multiple WLCs. In this application, when a failure is detected with one of the WLCs, a temporary bridge is established between that WLC and the PLC if there is no permanent bridge established between that WLC and the PLC.

Establishing a temporary bridge typically involves reworking the routing table in order to add the PLC as an outgoing interface in all routing table entries having the WLC as an outgoing interface. This takes a substantial amount of time during which no data flows over either the WLC or the PLC, especially in the case of multicast.

SUMMARY OF THE INVENTION

In accordance with one aspect of the invention, a pre-computed bridged routing table is used to quickly bridge a first communication interface and a second communication interface. The pre-computed bridged routing table includes the second communication interface as an outgoing interface in each routing table entry having the first communication interface as an outgoing interface. The bridged routing table is pre-computed for the pair of communication interfaces by searching a main routing table for all main routing table entries having the first communication interface as an outgoing interface and creating, for each such main routing table entry, a corresponding bridged routing table entry including all outgoing interfaces from the main routing table entry and additionally including the second (bridged) communication interface as an outgoing interface. Bridged routing tables may be pre-computed for multiple potential communication interface pairs.

BRIEF DESCRIPTION OF THE DRAWINGS

The foregoing and other objects and advantages of the invention will be appreciated more fully from the following further description thereof with reference to the accompanying drawings wherein:

FIG. 17 is a logic flow diagram showing exemplary logic for pre-computing a bridged routing table for a predetermined pair of line cards in accordance with an embodiment of the present invention; and FIG. 18 is a logic flow diagram showing exemplary protection switching logic that uses a pre-computed bridged routing table in accordance with an embodiment of the present invention.

DETAILED DESCRIPTION OF A PREFERRED EMBODIMENT

In an embodiment of the present invention, bridged routing table entries are pre-computed (i.e., before a failure is detected) for each of a number of potential WLC/PLC pairs. Specifically, for each potential WLC/PLC pair, a corresponding bridged routing table entry including the PLC as an outgoing interface is created for each routing table entry having the WLC as an outgoing interface. For convenience, the pre-computed bridged routing table entries associated with a particular WLC/PLC pair is referred to hereinafter as a "bridged routing table."

The bridged routing tables are typically distributed to all line cards before a failure is detected. Each line card typically stores the bridged routing tables locally in a memory for subsequent use performing protection switching. The line cards do not update their respective routing tables based upon the bridged routing tables until a failure is detected.

When a failure is detected for a particular WLC, the bridged routing table associated with the appropriate WLC/PLC pair is retrieved from the memory and is used to establish a temporary bridge between the WLC and the PLC. Specifically, each line card updates its routing table based upon the pre-computed routing table entries so that its routing table includes the PLC as an outgoing interface in all routing table entries having the corresponding WLC as an outgoing interface.

By pre-computing the bridged routing table entries for the bridged WLC/PLC pair, the bridged routing table entries do not have to be computed at the time the temporary bridge is being established. Therefore, the temporary bridge can be established quickly following detection of the failure.

Figure 1:
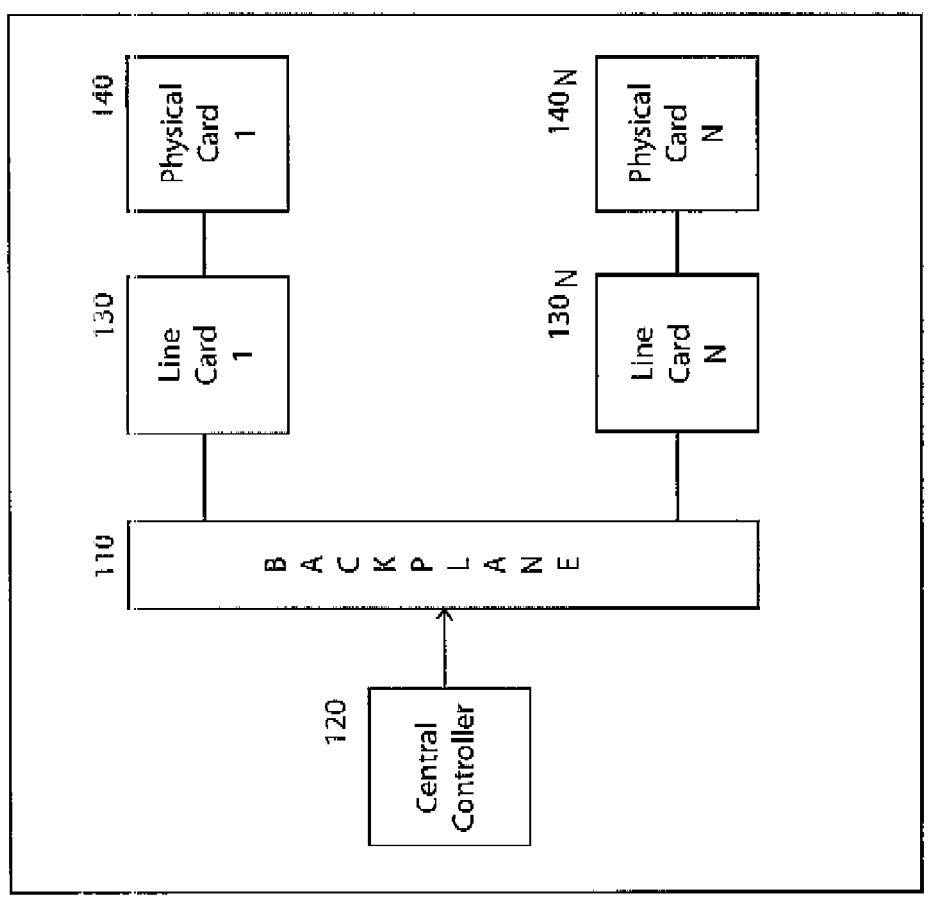
FIG. 1 is a block diagram showing the relevant components of an exemplary networking device in accordance with an embodiment of the present invention.

FIG. 1 shows the relevant components of an exemplary networking device 100. Among other things, the networking device 100 includes at least one central controller 120, a number of line cards $130_1$–$130_N$, and a number of physical cards $140_1$–$140_N$. The central controller 120 provides management and control for the networking device 100 as a whole. A typical embodiment of the networking device 100 includes two redundant central controllers. The central controller 120 and the line cards $130_1$–$130_N$ are interconnected via a backplane 110. The backplane 110 includes, among other things, a switching fabric for high-speed communication between the line cards $130_1$–$130_N$, a fast bus for downloading routing tables from the central controller 120 to the line cards $130_1$–$130_N$, and a slow bus for management of the line cards $130_1$–$130_N$ by the central controller 120. The line cards $130_1$–$130_N$ are inserted into physical slots of the networking device 100. Each physical slot is associated with a slot of the switching fabric (referred to hereinafter as a "fabric slot"). Thus, each line card $130_1$–$130_N$ is coupled to a corresponding fabric slot.

Each line card $130_1$–$130_N$ is coupled to a respective physical card $140_1$–$140_N$. For convenience, the combination of a line card 130 and a physical card 140 is sometimes referred to as a "circuit pack group." The line cards $130_1$–$130_N$ provide various networking services for communicating with various external devices. Exemplary line card types include Internet Protocol (IP) and Asynchronous Transfer Mode (ATM). The physical cards $140_1$–$140_N$ provide physical interfaces for communicating with various external devices. Exemplary physical card types include Ethernet and SONET. Exemplary circuit pack groups include ATM-over-SONET and IP-over-SONET.

Figure 2:
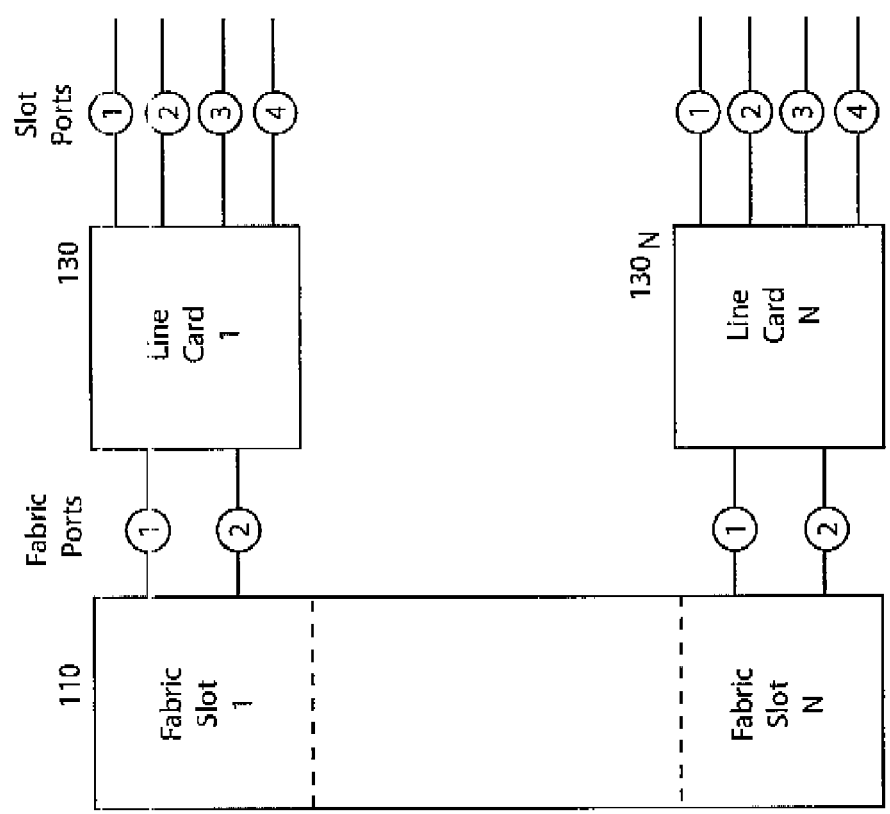
FIG. 2 is a block diagram that demonstrates the relationship between the line cards and the switching fabric of an exemplary networking device in accordance with an embodiment of the present invention.

FIG. 2 shows the line cards $130_1$–$130_N$ coupled to the switching fabric of the backplane 110. Each line card $130_1$–$130_N$ is associated with a corresponding fabric slot, and interfaces with the switching fabric through a number of fabric ports. Each line card $130_1$–$130_N$ also includes a number of slot ports. In the example shown in FIG. 2, each line card $130_1$–$130_N$ is coupled to its corresponding fabric slot via two fabric ports (fabric port 1 and fabric port 2), and each line card $130_1$–$130_N$ includes four slot ports (slot port 1, slot port 2, slot port 3, and slot port 4. It should be noted that each line card $130_1$–$130_N$ may be coupled to the switching fabric via one or more fabric ports, and may have one or more slot ports.

Within the networking device 100, the switching fabric routes information between the various line cards. Specifically, the switching fabric is capable of routing a packet from an incoming line card to one or more destination line cards based upon a header that is added to the packet by the incoming line card. The header identifies one or more destination slots for the packet. The header may also indicate the destination fabric port for each destination slot and the destination slot port(s) for each destination slot.

Each line card $130_1$–$130_N$ includes logic for receiving, processing, and transmitting packets. Each line card can receive and transmit packets over its fabric port(s) and over its slot port(s). Each line card maintains a routing table that is typically distributed to the line cards $130_1$–$130_N$ by the central controller 120. The routing table includes a number of routing table entries, where each routing table entry indicates, among other things, the outgoing interface(s) associated with a particular destination. An outgoing interface can be a slot port on the same line card as indicated by a slot port number, a different line card as indicated by a slot number, or a specific fabric port on a different line card as indicated by a slot number/fabric port number pair.

Figure 3:
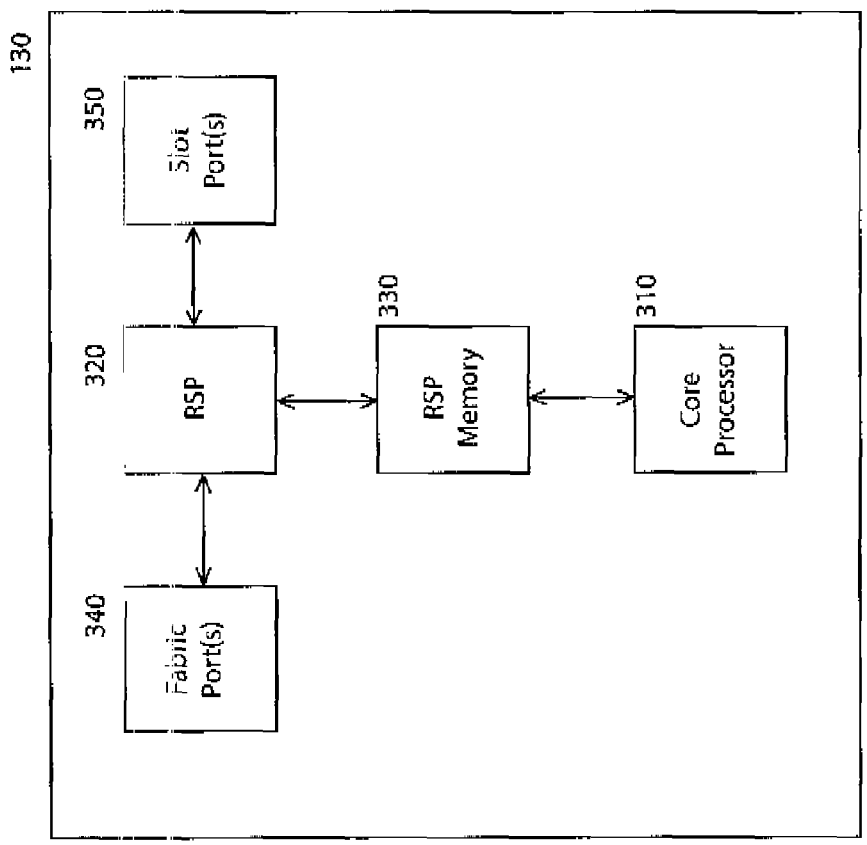
FIG. 3 is a block diagram showing the relevant components of an exemplary line card in accordance with an embodiment of the present invention.

FIG. 3 shows the relevant components of an exemplary line card 130. Among other things, the line card 130 includes a core processor 310, at least one routing switch processor (RSP) 320 for processing packets, an RSP memory 330 for storing the routing table, fabric port(s) 340, and slot port(s) 350. The RSP 320 is an Application Specific Integrated Circuit (ASIC) that is essentially a fast-forwarding engine including, among other things, inbound filtering logic, outbound filtering logic, policy filtering logic, Committed Information Rate (CIR) logic, and Type of Service (TOS) logic. The RSP memory 330 is used to store the routing table. The core processor 310 provides management and control for the line card 130, and includes logic for receiving the routing table from the central controller 120 over the fast bus, storing the routing table in the RSP memory 330, and configuring the RSP 320 based upon predetermined configuration information. It should be noted that FIG. 3 does not show all components of the line card 130, nor does it show all connections between components.

When a packet is received from a slot port 350, the RSP 320 uses the routing table in the RSP memory 330 to determine the outgoing interface(s) for the packet. Assuming that the packet needs to be forwarded to at least one other line card, the RSP 320 creates a header for the packet indicating at least the destination slot(s) for the packet, adds the header to the packet, and forwards the packet to the switching fabric over a fabric port 340.

Figure 4:
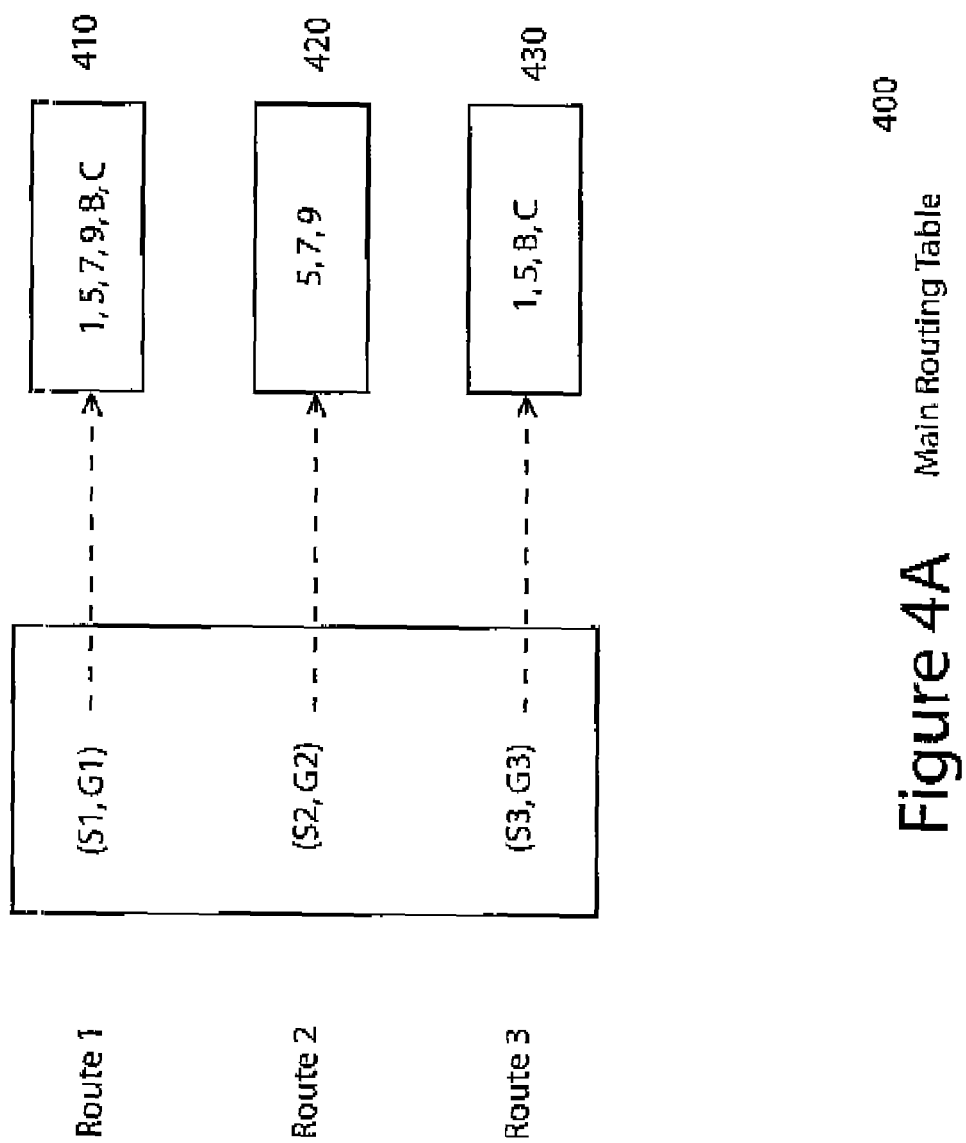
FIG. 4A shows an exemplary main routing table in accordance with an embodiment of the present invention.
FIG. 4B shows an exemplary main routing vector in accordance with an embodiment of the present invention.

FIG. 4A shows an exemplary routing table 400 having three multicast routes. Each multicast route is associated with a particular (source, group) pair. Route 1 is associated with a (S1,G1) pair, and has, as its outgoing interfaces 410, slots 1, 5, 7, 9, B, and C. Route 2 is associated with a (S2,G2) pair, and has, as its outgoing interfaces 420, slots 5, 7, and 9. Route 3 is associated with a (S3,G3) pair, and has, as its outgoing interfaces 430, slots 1, 5, B, and C. In the exemplary routing table 400, slot B and slot C are already bridged, such that slot C is included as an outgoing interface in each routing table entry (410, 430) that includes slot B as an outgoing interface. The routing table 400 is referred to hereinafter as the "main" routing table in order to distinguish it from bridged routing tables established in various embodiments of the invention.

A routing vector is typically maintained for each route in the main routing table 400. Each routing vector indicates the fabric slots and slot ports associated with its corresponding route. The routing vectors are used by the line cards $130_1$–$130_N$ to create headers for sending packets over the switching fabric.

Figure 4B:
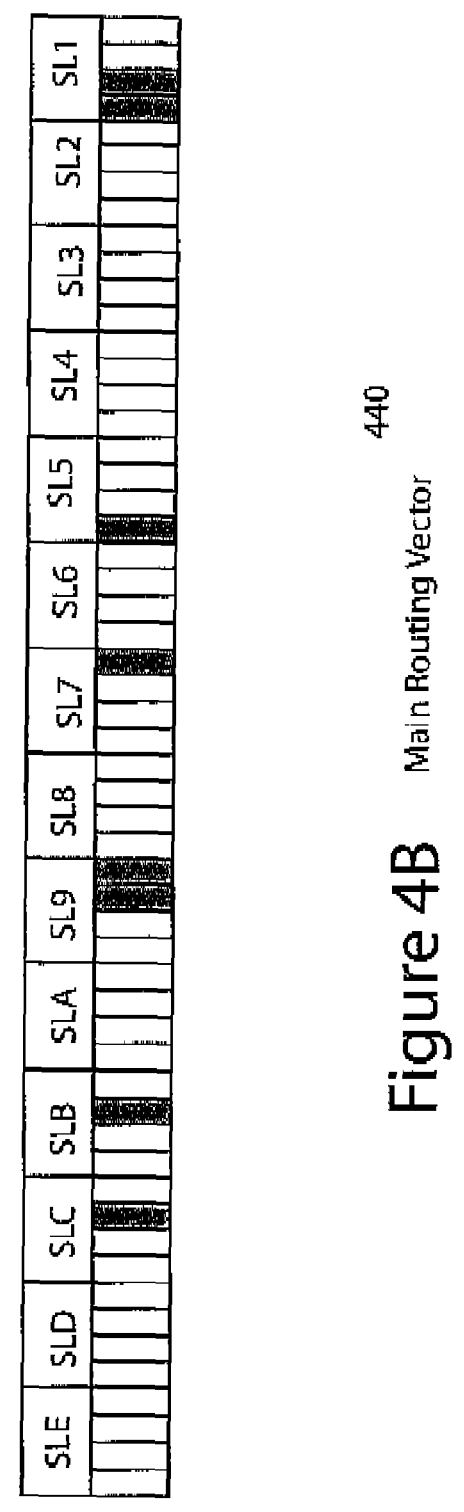

FIG. 4B shows an exemplary routing vector 440 for Route 1 in the main routing table 400. The routing vector 440 indicates the fabric slots associated with Route 1 in the main routing table 400, and also indicates the slot port(s) for each fabric slot. Specifically, the routing vector 440 indicates slot ports 3 and 4 for fabric slot 1, slot port 4 for fabric slot 5, slot port 1 for fabric slot 7, slot ports 1 and 2 for fabric slot 9, slot port 2 for fabric slot B, and slot port 2 for fabric slot C. The routing vector 440 is referred to hereinafter as the "main" routing vector for Route 1 in the main routing table 400 in order to distinguish it from bridged routing vectors established in various embodiments of the present invention described below. It should be noted that a similar routing vector would be established for Route 2 and Route 3 in the main routing table 400.

In an embodiment of the present invention, a bridged routing table is pre-computed for each of a number of potential WLC/PLC pairs. In order to create a bridged routing table for a particular WLC/PLC pair, the main routing table 400 is traversed, and each routing table entry having the WLC as an outgoing interface is copied into the bridged routing table and the PLC is added as an outgoing interface. A reference is maintained to the corresponding routing table entry in the main routing table 400. A corresponding bridged routing vector identifying the slot ports for the PLC (corresponding to the slots ports for the WLC) is also created. The bridged routing tables and bridged routing vectors are not stored in the RSP memories until a bridge is established, but are instead stored in a general purpose memory accessible to the central controller 120 and/or the line cards $130_1$–$130_N$.

Various aspects of the present invention can be demonstrated by example.

In a first example, each WLC is protected by a different PLC. Specifically, slot 2 is used as a backup for slot 1, slot 6 is used as a backup for slot 5, slot 8 is used as a backup for slot 7, and slot A is used as a backup for slot 9. As in the prior example, slots B and C are already bridged, with slot C acting as a backup for slot B. Thus, bridged routing tables are pre-computed for the [Slot1,Slot2] pair, the [Slot5,Slot6] pair, the [Slot7,Slot8] pair, and the [Slot9,SlotA] pair. A corresponding bridged routing vector is created for each bridged routing table. There is no need to compute a bridged routing table and bridged routing vector for the [SlotB, SlotC] pair, since slots B and C are already bridged.

Figure 5:
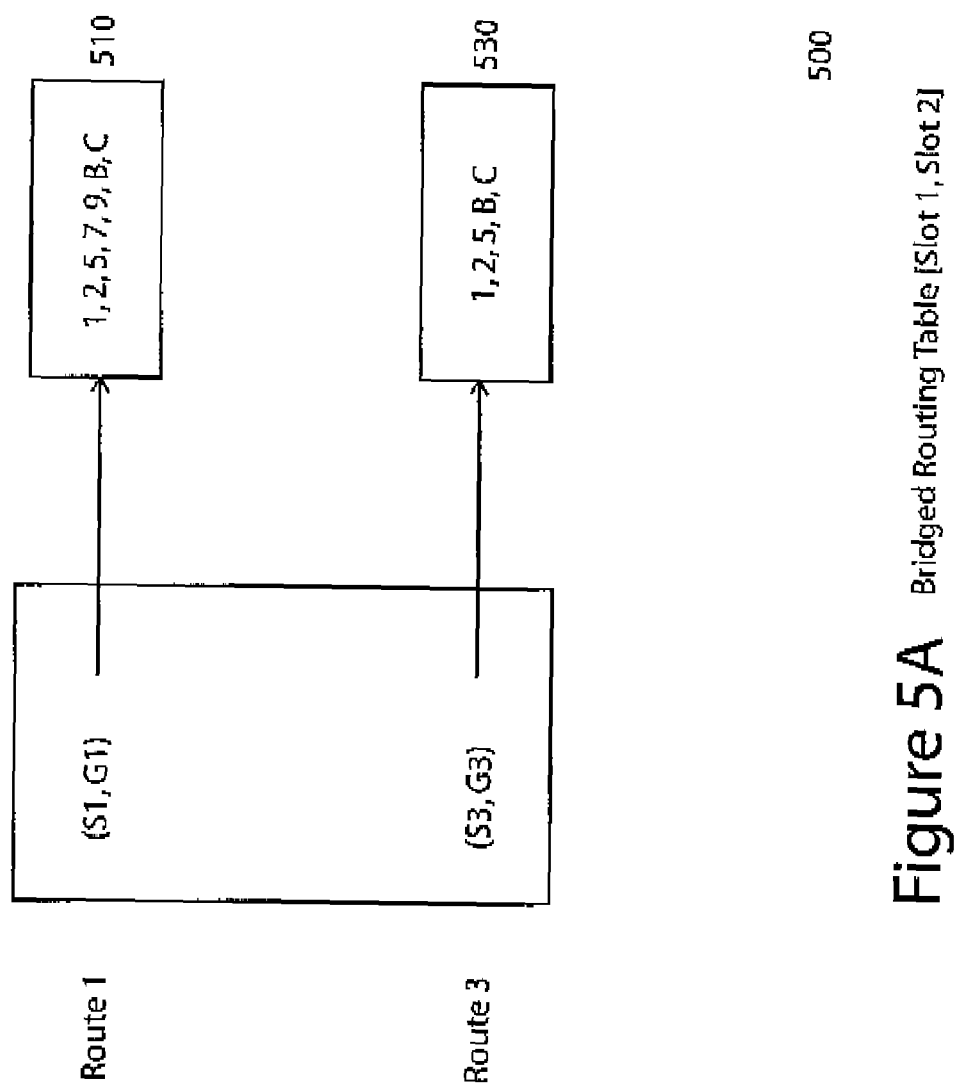
FIG. 5A shows an exemplary bridged routing table for a [Slot1,Slot2] pair in accordance with an embodiment of the present invention.
FIG. 5B shows an exemplary bridged routing vector for a [Slot1,Slot2] pair in accordance with an embodiment of the present invention.

FIG. 5A shows a bridged routing table 500 for the [Slot1,Slot2] pair. The bridged routing table 500 includes routes 1 and 3 from the main routing table 400. Route 1 has, as its outgoing interfaces 510, slots 1, 2, 5, 7, 9, B, and C. Route 3 has, as its outgoing interfaces 530, slots 1, 2, 5, B, and C. The bridged routing table 500 also includes corresponding references to the outgoing interfaces lists 410 and 430 in the main routing table 400.

Figure 5B:
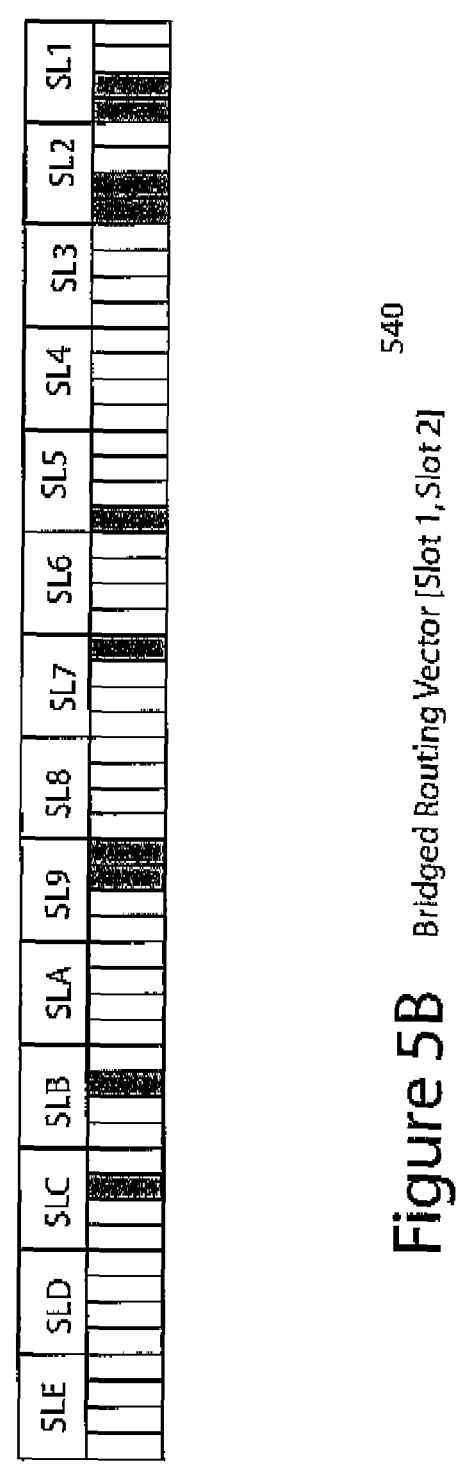

FIG. 5B shows a bridged routing vector 540 for Route 1 of the bridged routing table 500. The bridged routing vector 540 indicates slot ports 3 and 4 for fabric slot 1, slot ports 3 and 4 for fabric slot 2 (bridged from fabric slot 1), slot port 4 for fabric slot 5, slot port 1 for fabric slot 7, slot ports 1 and 2 for fabric slot 9, slot port 2 for fabric slot B, and slot port 2 for fabric slot C.

Figure 6:
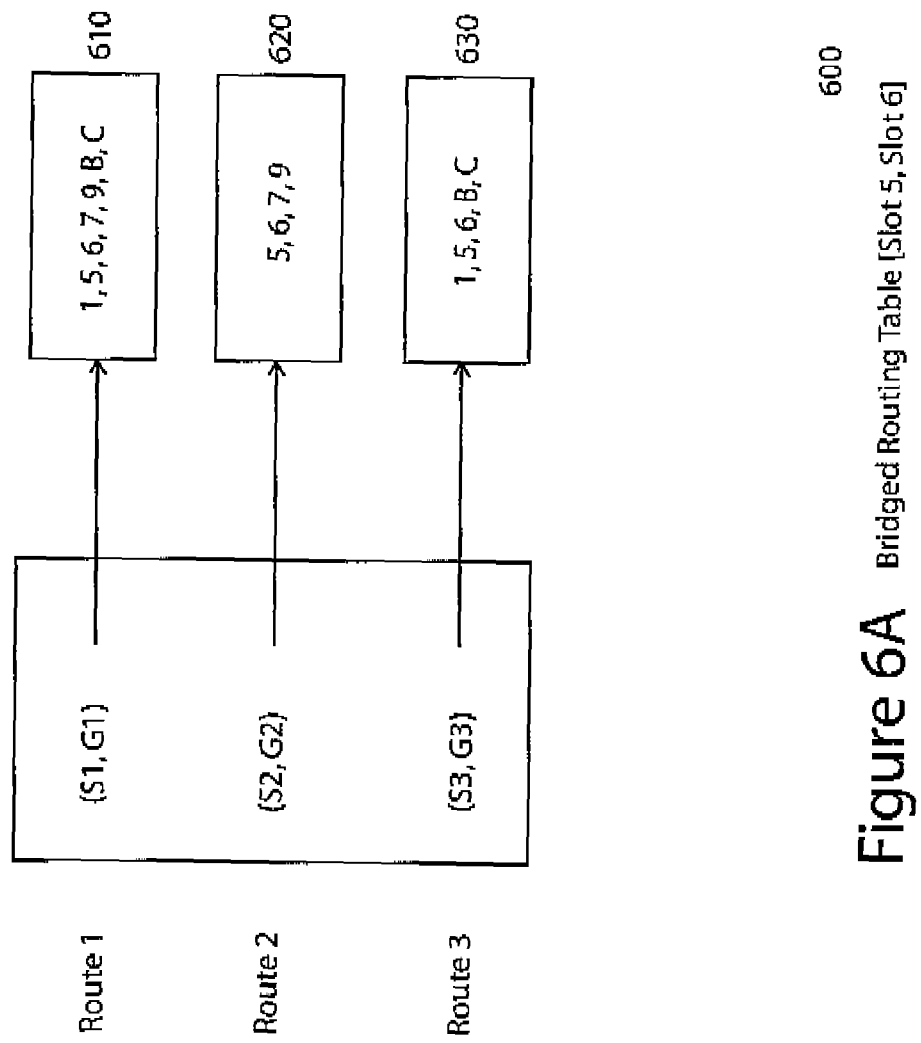
FIG. 6A shows an exemplary bridged routing table for a [Slot5,Slot6] pair in accordance with an embodiment of the present invention.
FIG. 6B shows an exemplary bridged routing vector for a [Slot5,Slot6] pair in accordance with an embodiment of the present invention.

FIG. 6A shows a bridged routing table 600 for the [Slot5,Slot6] pair. The bridged routing table 600 includes routes 1, 2, and 3 from the main routing table 400. Route 1 has, as its outgoing interfaces 610, slots 1, 5, 6, 7, 9, B, and C. Route 2 has, as its outgoing interfaces 620, slots 5, 6, 7, and 9. Route 3 has, as its outgoing interfaces 630, slots 1, 5, 6, B, and C. The bridged routing table 600 also includes corresponding references to the outgoing interfaces lists 410, 420, and 430 in the main routing table 400.

Figure 6B:
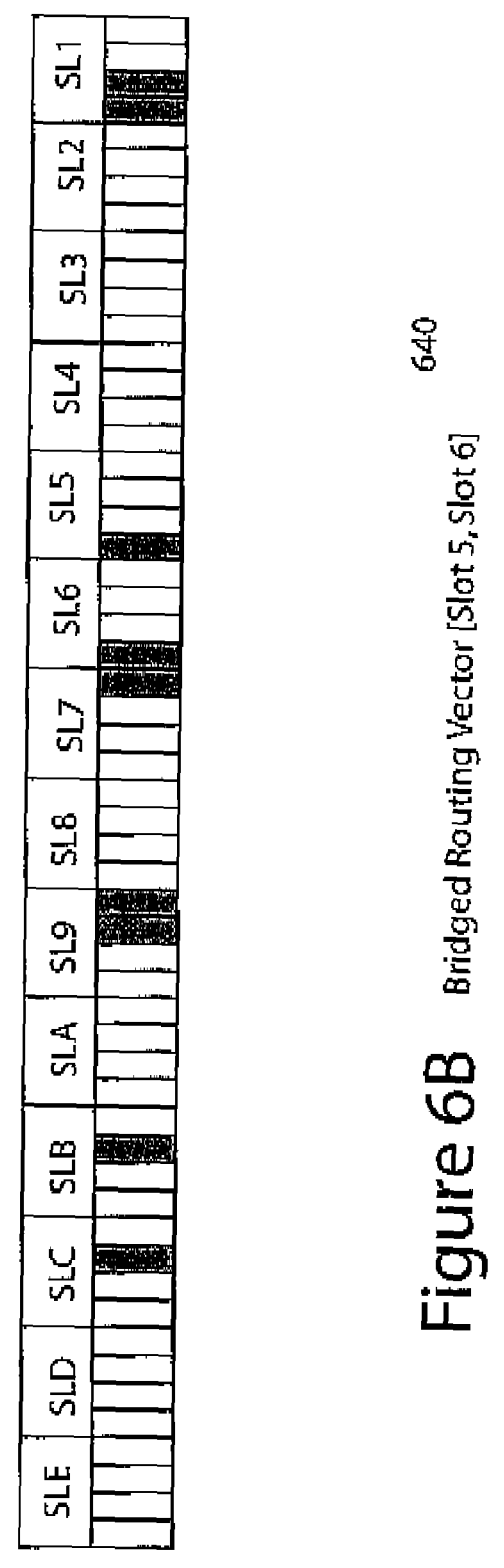

FIG. 6B shows a bridged routing vector 640 for Route 1 of the bridged routing table 600. The bridged routing vector 640 indicates slot ports 3 and 4 for fabric slot 1, slot port 4 for fabric slot 5, slot port 4 for fabric slot 6 (bridged from fabric slot 5), slot port 1 for fabric slot 7, slot ports 1 and 2 for fabric slot 9, slot port 2 for fabric slot B, and slot port 2 for fabric slot C.

Figure 7:
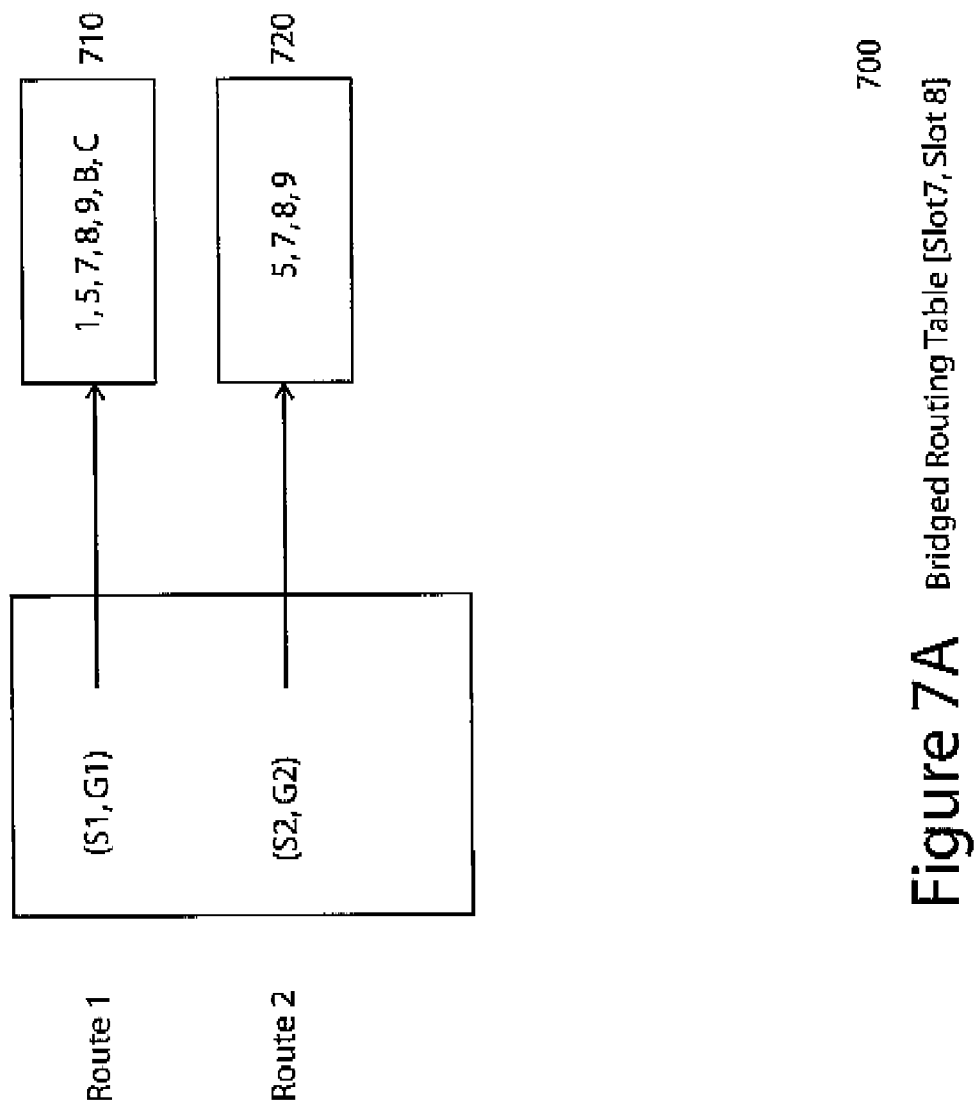
FIG. 7A shows an exemplary bridged routing table for a [Slot7,Slot8] pair in accordance with an embodiment of the present invention.
FIG. 7B shows an exemplary bridged routing vector for a [Slot7,Slot8] pair in accordance with an embodiment of the present invention.

FIG. 7A shows a bridged routing table 700 for the [Slot7,Slot8] pair. The bridged routing table 700 includes routes 1 and 2 from the main routing table 400. Route 1 has, as its outgoing interfaces 710, slots 1, 5, 7, 8, 9, B, and C. Route 2 has, as its outgoing interfaces 720, slots 5, 7, 8, and 9. The bridged routing table 700 also includes corresponding references to the outgoing interfaces lists 410 and 420 in the main routing table 400.

Figure 7B:
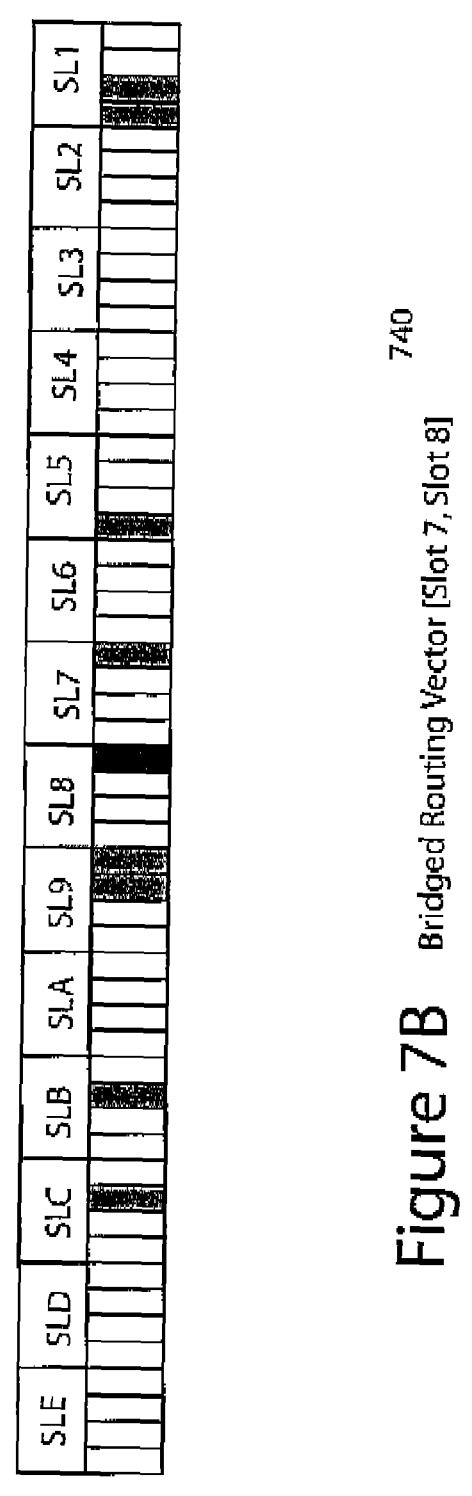

FIG. 7B shows a bridged routing vector 740 for Route 1 of the bridged routing table 700. The bridged routing vector 740 indicates slot ports 3 and 4 for fabric slot 1, slot port 4 for fabric slot 5, slot port 1 for fabric slot 7, slot port 1 for fabric slot 8 (bridged from fabric slot 7), slot ports 1 and 2 for fabric slot 9, slot port 2 for fabric slot B, and slot port 2 for fabric slot C.

Figure 8:
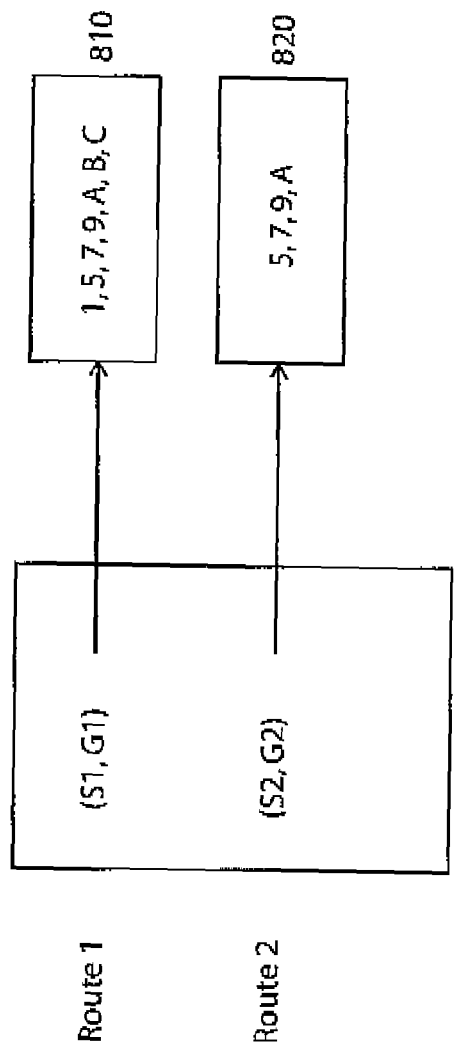
FIG. 8A shows an exemplary bridged routing table for a [Slot9,SlotA] pair in accordance with an embodiment of the present invention.
FIG. 8B shows an exemplary bridged routing vector for a [Slot9,SlotA] pair in accordance with an embodiment of the present invention.

FIG. 8A shows a bridged routing table 800 for the [Slot9,SlotA] pair. The bridged routing table 800 includes routes 1 and 2 from the main routing table 400. Route 1 has, as its outgoing interfaces 810, slots 1, 5, 7, 9, A, B, and C. Route 2 has, as its outgoing interfaces 820, slots 5, 7, 9, and A. The bridged routing table 800 also includes corresponding references to the outgoing interfaces lists 410 and 420 in the main routing table 400.

Figure 8B:
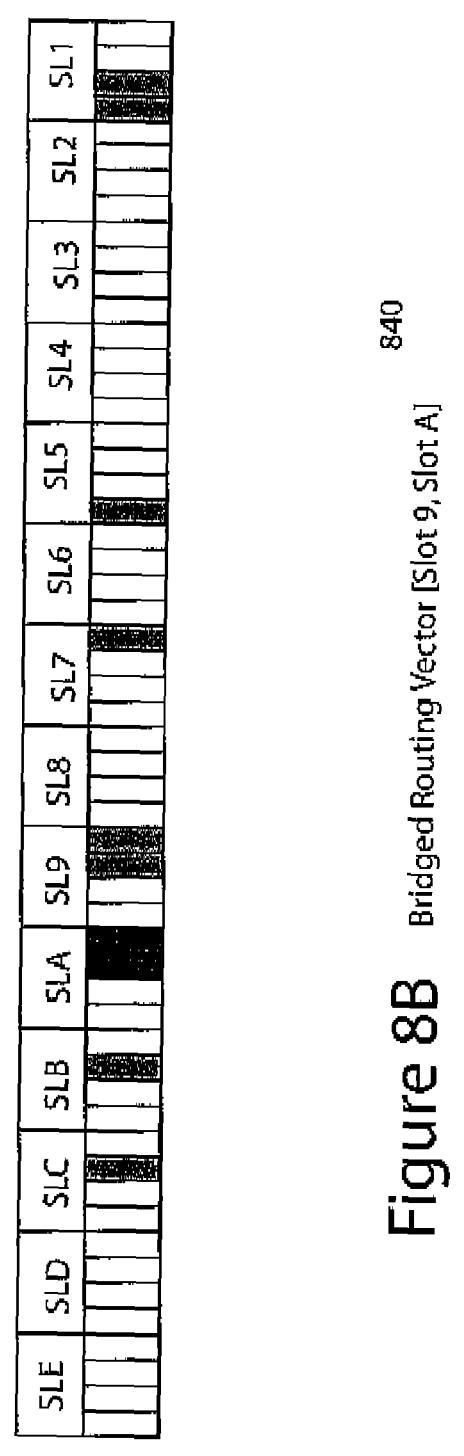

FIG. 8B shows a bridged routing vector 840 for Route 1 of the bridged routing table 800. The bridged routing vector 840 indicates slot ports 3 and 4 for fabric slot 1, slot port 4 for fabric slot 5, slot port 1 for fabric slot 7, slot ports 1 and 2 for fabric slot 9, slot ports 1 and 2 for fabric slot A (bridged from fabric slot 9), slot port 2 for fabric slot B, and slot port 2 for fabric slot C.

In a second example, a single PLC is used as a backup for multiple WLCs. Specifically, slot E is used as a backup for slots 1, 5, 7, and 9. As in the prior examples, slots B and C are already bridged, with slot C acting as a backup for slot B. Thus, bridged routing tables are pre-computed for the [Slot1,SlotE] pair, the [Slot5,SlotE] pair, the [Slot7,SlotE] pair, and the [Slot9,SlotE] pair. A corresponding bridged routing vector is created for each bridged routing table. There is no need to compute a bridged routing table and bridged routing vector for the [SlotB,SlotC] pair, since slots B and C are already bridged.

Figure 9:
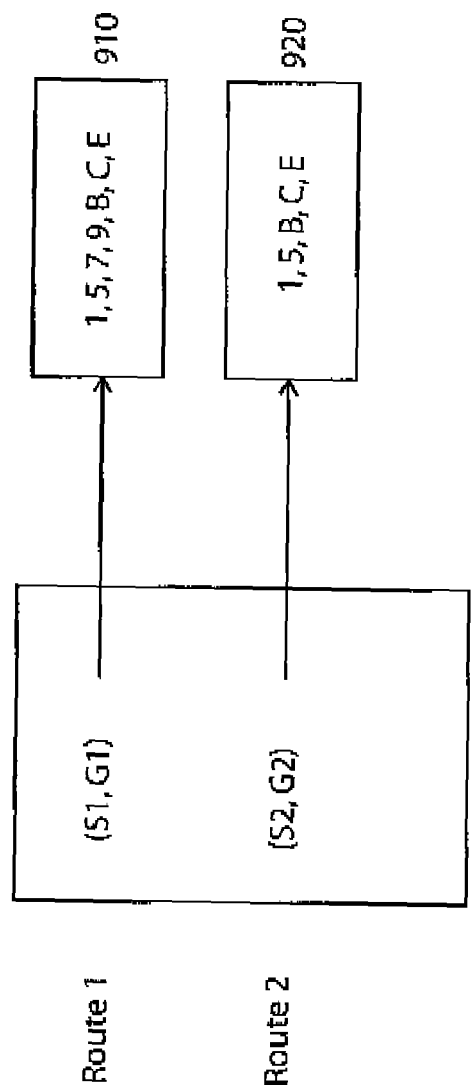
FIG. 9A shows an exemplary bridged routing table for a [Slot1,SlotE] pair in accordance with an embodiment of the present invention.
FIG. 9B shows an exemplary bridged routing vector for a [Slot1,SlotE] pair in accordance with an embodiment of the present invention.

FIG. 9A shows a bridged routing table 900 for the [Slot1,SlotE] pair. The bridged routing table 900 includes routes 1 and 3 from the main routing table 400. Route 1 has, as its outgoing interfaces 910, slots 1, 5, 7, 9, B, C, and E. Route 3 has, as its outgoing interfaces 930, slots 1, 5, B, C, and E. The bridged routing table 900 also includes corresponding references to the outgoing interfaces lists 410 and 430 in the main routing table 400.

Figure 9B:
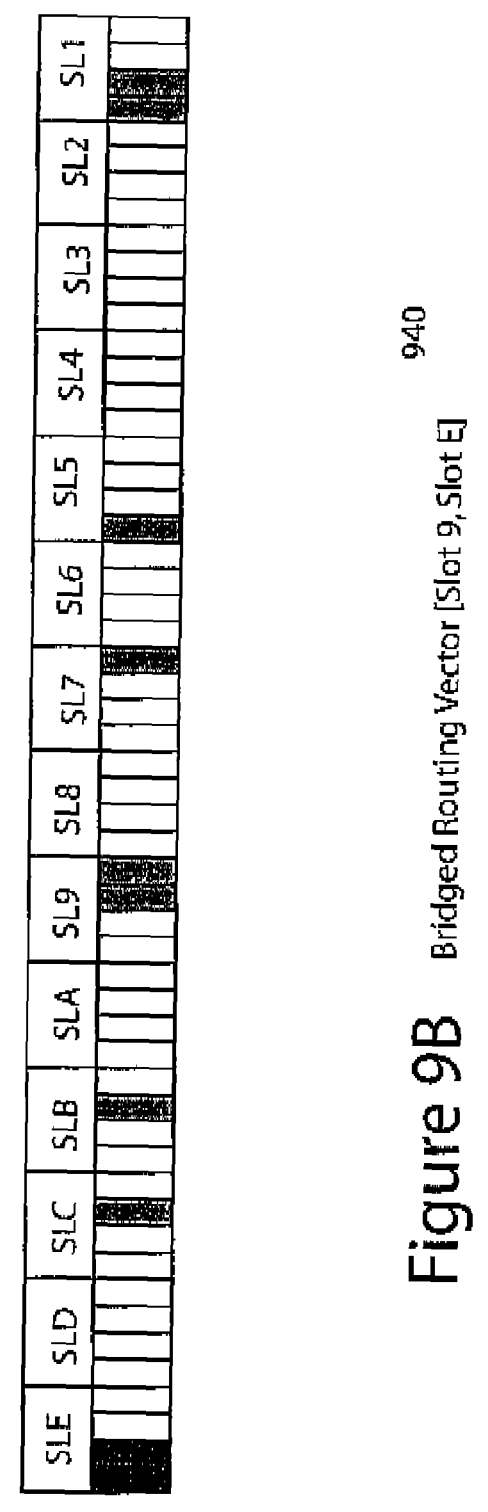

FIG. 9B shows a bridged routing vector 940 for Route 1 of the bridged routing table 900. The bridged routing vector 940 indicates slot ports 3 and 4 for fabric slot 1, slot port 4 for fabric slot 5, slot port 1 for fabric slot 7, slot ports 1 and 2 for fabric slot 9, slot port 2 for fabric slot B, slot port 2 for fabric slot C, and slot ports 3 and 4 for fabric slot E (bridged from fabric slot 1).

Figure 10:
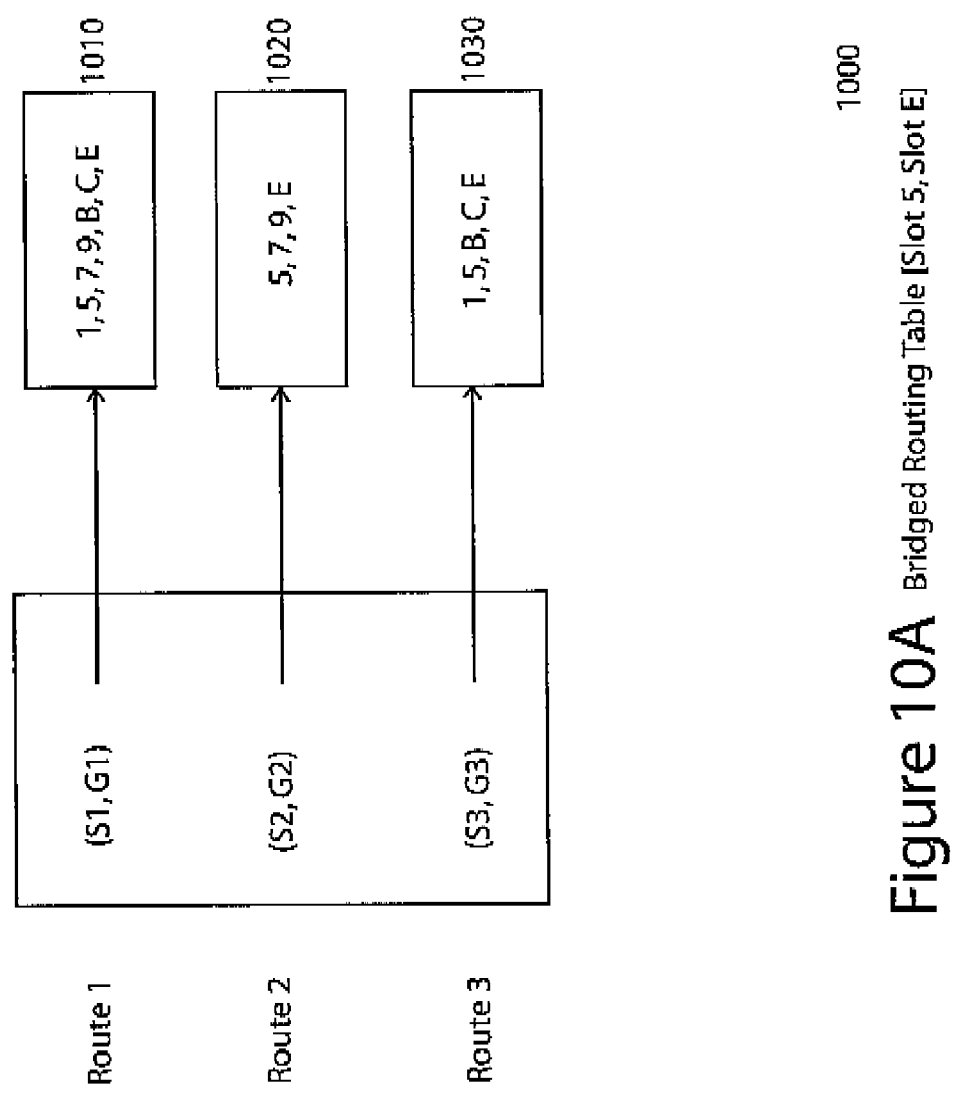
FIG. 10A shows an exemplary bridged routing table for a [Slot5,SlotE] pair in accordance with an embodiment of the present invention.
FIG. 10B shows an exemplary bridged routing vector for a [Slot5,SlotE] pair in accordance with an embodiment of the present invention.

FIG. 10A shows a bridged routing table 1000 for the [Slot5,SlotE] pair. The bridged routing table 1000 includes routes 1, 2, and 3 from the main routing table 400. Route 1 has, as its outgoing interfaces 1010, slots 1, 5, 7, 9, B, C, and E. Route 2 has, as its outgoing interfaces 1020, slots 5, 7, 9, and E. Route 3 has, as its outgoing interfaces 1030, slots 1, 5, B, C, and E. The bridged routing table 1000 also includes corresponding references to the outgoing interfaces lists 410, 420, and 430 in the main routing table 400.

Figure 10B:
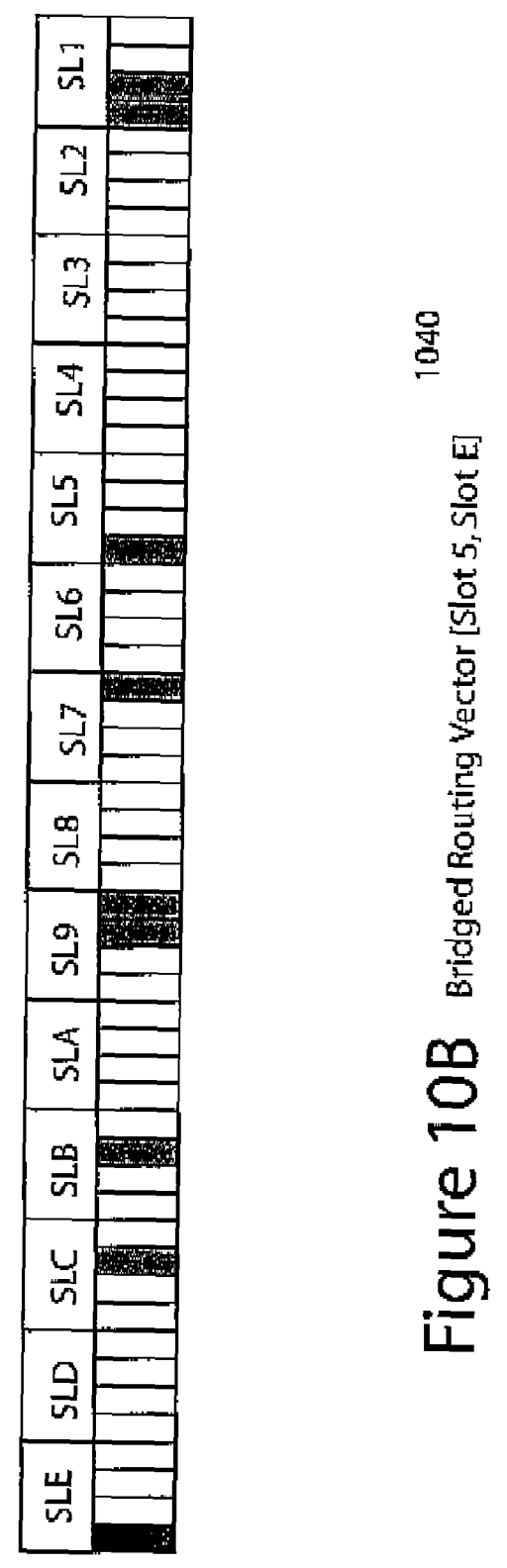

FIG. 10B shows a bridged routing vector 1040 for Route 1 of the bridged routing table 1000. The bridged routing vector 1040 indicates slot ports 3 and 4 for fabric slot 1, slot port 4 for fabric slot 5, slot port 1 for fabric slot 7, slot ports 1 and 2 for fabric slot 9, slot port 2 for fabric slot B, slot port 2 for fabric slot C, and slot port 4 for fabric slot E (bridged from fabric slot 5).

Figure 11:
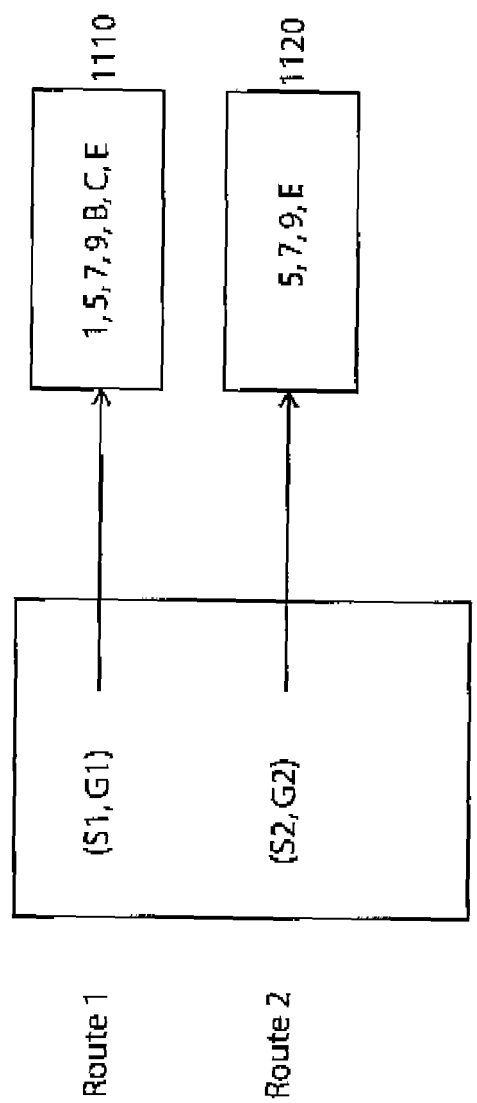
FIG. 11A shows an exemplary bridged routing table for a [Slot7,SlotE] pair in accordance with an embodiment of the present invention.
FIG. 11B shows an exemplary bridged routing vector for a [Slot7,SlotE] pair in accordance with an embodiment of the present invention.

FIG. 11A shows a bridged routing table 1100 for the [Slot7,SlotE] pair. The bridged routing table 1100 includes routes 1 and 2 from the main routing table 400. Route 1 has, as its outgoing interfaces 1110, slots 1, 5, 7, 9, B, C, and E. Route 2 has, as its outgoing interfaces 1120, slots 5, 7, 9, and E. The bridged routing table 1100 also includes corresponding references to the outgoing interfaces lists 410 and 420 in the main routing table 400.

Figure 11B:
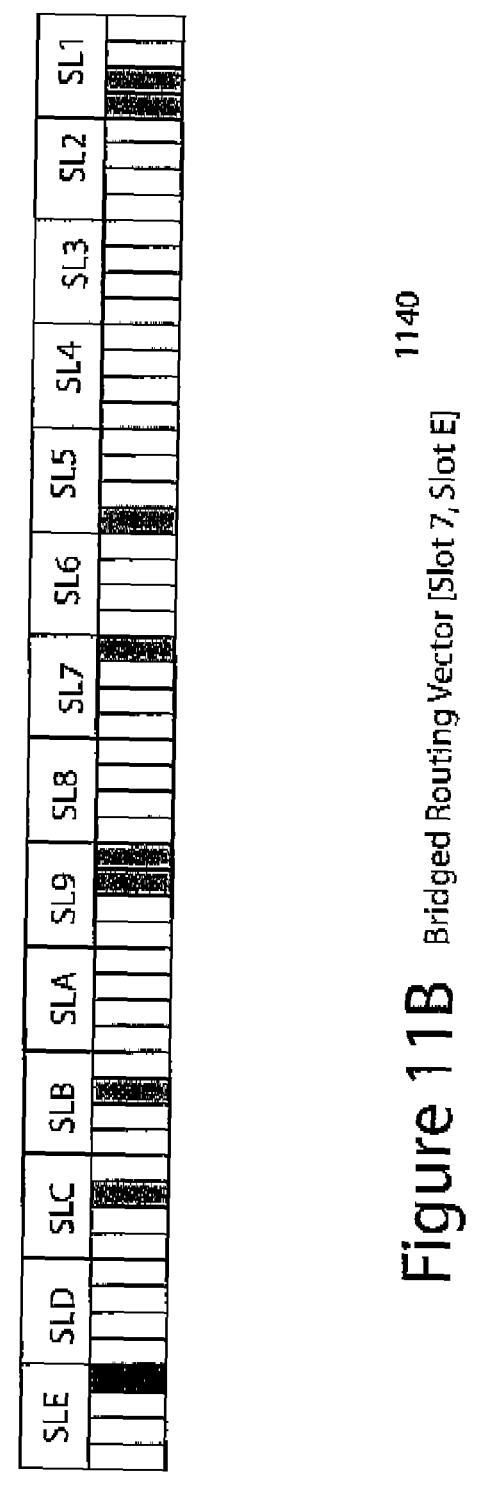

FIG. 11B shows a bridged routing vector 1140 for Route 1 of the bridged routing table 1100. The bridged routing vector 1140 indicates slot ports 3 and 4 for fabric slot 1, slot port 4 for fabric slot 5, slot port 1 for fabric slot 7, slot ports 1 and 2 for fabric slot 9, slot port 2 for fabric slot B, slot port 2 for fabric slot C, and slot port 1 for fabric slot E (bridged from fabric slot 7).

Figure 12:
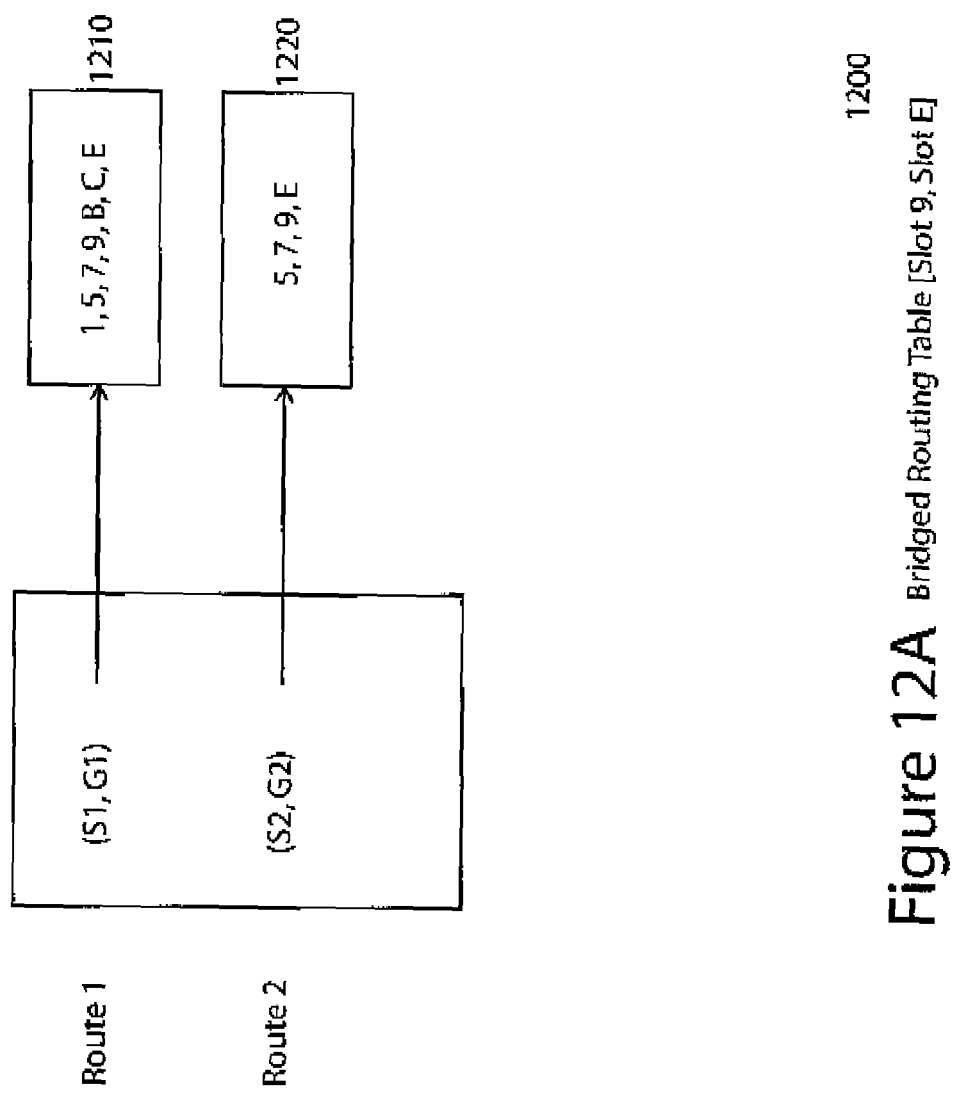
FIG. 12A shows an exemplary bridged routing table for a [Slot9,SlotE] pair in accordance with an embodiment of the present invention.
FIG. 12B shows an exemplary bridged routing vector for a [Slot9,SlotE] pair in accordance with an embodiment of the present invention.

FIG. 12A shows a bridged routing table 1200 for the [Slot9,SlotE] pair. The bridged routing table 1200 includes routes 1 and 2 from the main routing table 400. Route 1 has, as its outgoing interfaces 1210, slots 1, 5, 7, 9, B, C, and E. Route 2 has, as its outgoing interfaces 1220, slots 5, 7, 9, and E. The bridged routing table 1200 also includes corresponding references to the outgoing interfaces lists 410 and 420 in the main routing table 400.

Figure 12B:
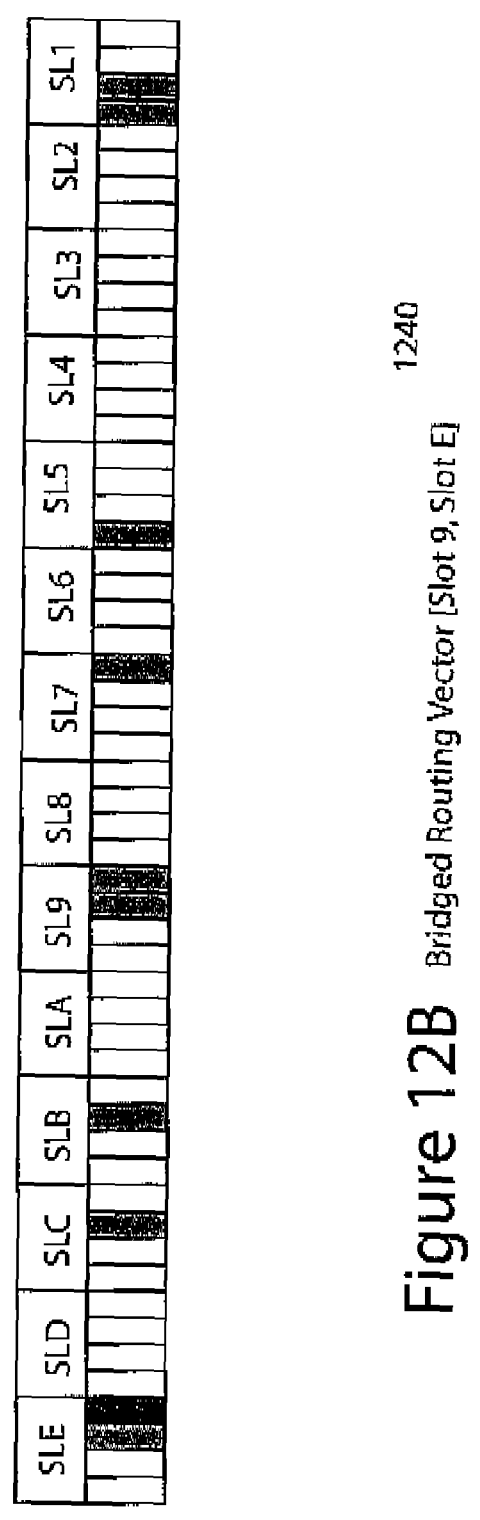

FIG. 12B shows a bridged routing vector 1240 for Route 1 of the bridged routing table 1200. The bridged routing vector 1240 indicates slot ports 3 and 4 for fabric slot 1, slot port 4 for fabric slot 5, slot port 1 for fabric slot 7, slot ports 1 and 2 for fabric slot 9, slot port 2 for fabric slot B, slot port 2 for fabric slot C, and slot ports 1 and 2 for fabric slot E (bridged from fabric slot 9).

Figure 13:
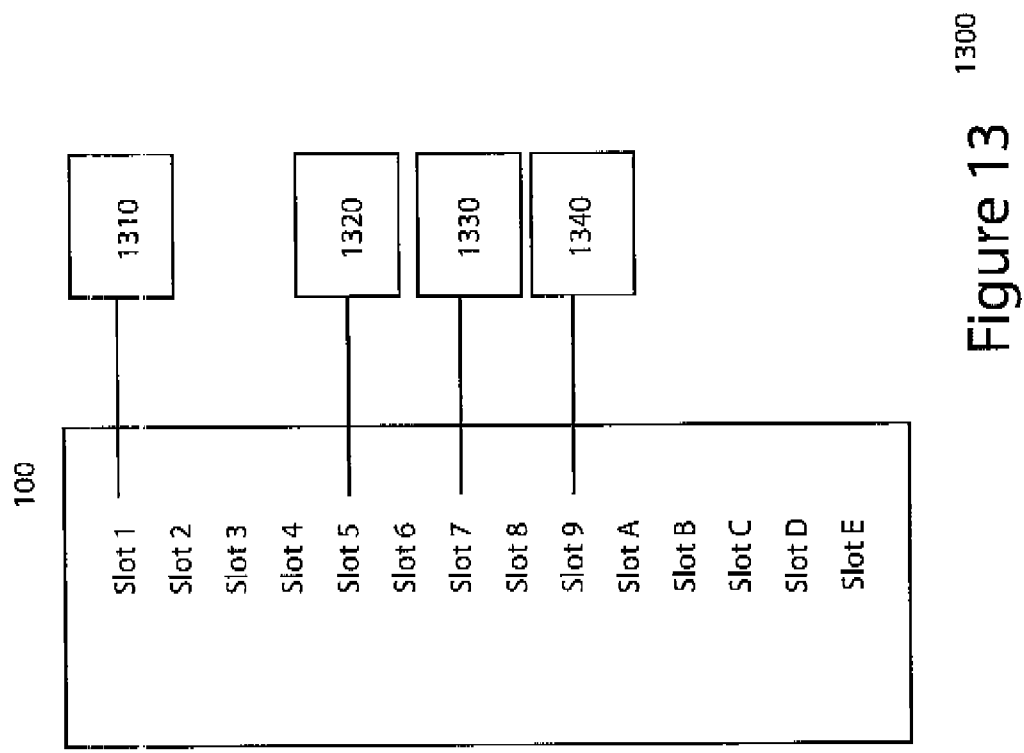
FIG. 13 is a system diagram showing a networking device in communication with various external devices in accordance with an embodiment of the present invention.

FIG. 13 shows an exemplary communication system 1300 in which the networking device 100 is coupled to various external devices. The networking device 100 is coupled via slot 1 to external device 1310. The networking device 100 is coupled via slot 5 to external device 1320. The networking device 100 is coupled via slot 7 to external device 1330. The networking device 100 is coupled via slot 9 to external device 1340. For the sake of simplicity, network connections involving slots B and C of the networking device 100 are not shown.

Figure 14:
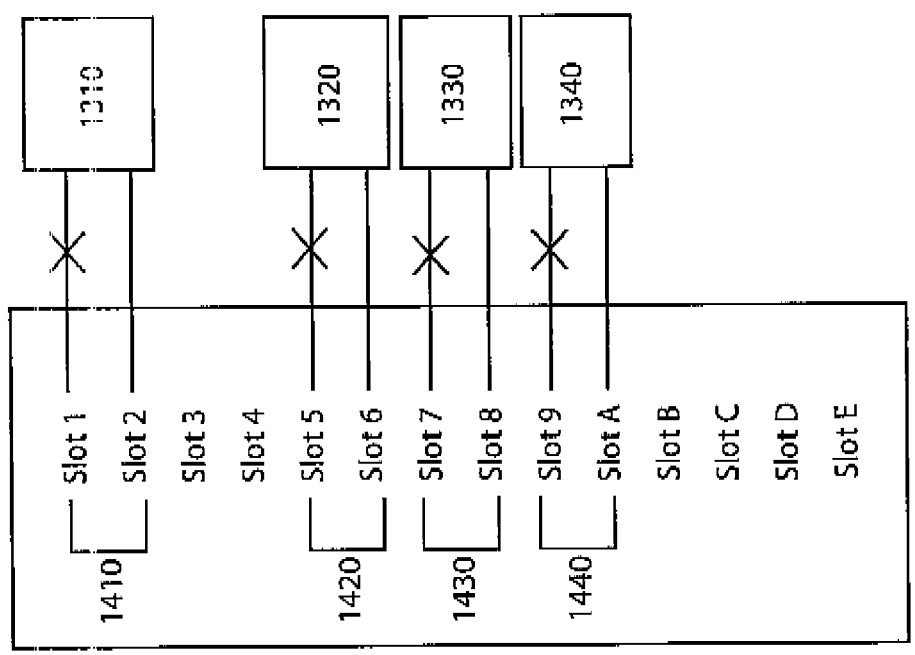
FIG. 14 is a system diagram showing a networking device in communication with various external devices using bridges in accordance with an embodiment of the present invention in which each working line card is protected by a different protection line card.

FIG. 14 shows an exemplary communication system 1400 in which each WLC is protected by a different PLC as in the first example described above. Because each WLC is protected by a different PLC, failures affecting multiple WLCs can be bypassed by establishing the appropriate bridges. A temporary bridge 1410 is established between slots 1 and 2 using the bridged routing table 500 in order to bypass a failure affecting communication with external device 1310 over slot 1. A temporary bridge 1420 is established between slots 5 and 6 using the bridged routing table 600 in order to bypass a failure affecting communication with external device 1320 over slot 5. A temporary bridge 1430 is established between slots 7 and 8 using the bridged routing table 700 in order to bypass a failure affecting communication with external device 1330 over slot 7. A temporary bridge 1440 is established between slots 9 and A using the bridged routing table 800 in order to bypass a failure affecting communication with external device 1340 over slot 9.

Figure 15:
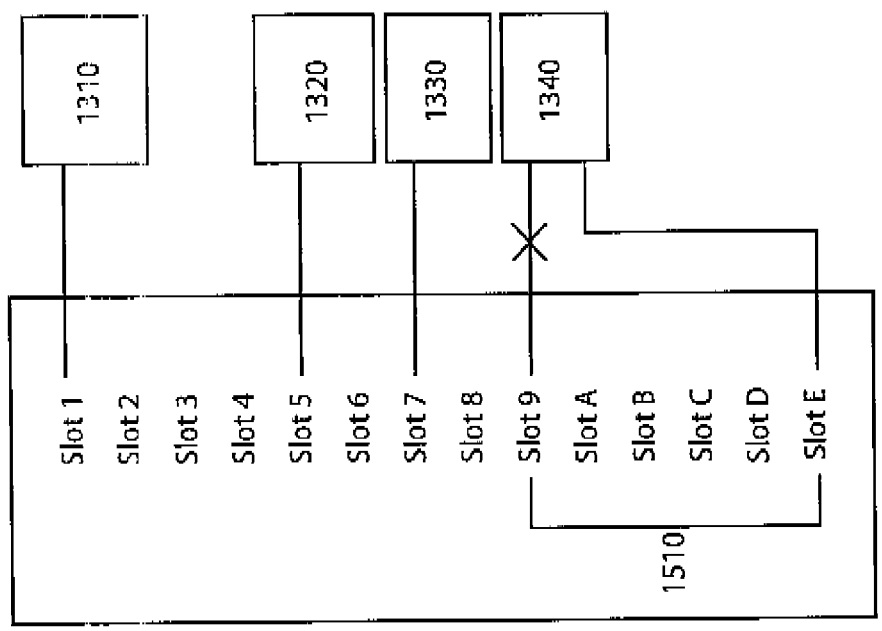
FIG. 15 is a system diagram showing a networking device in communication with various external devices using a bridge in accordance with an embodiment of the present invention in which a single protection line card is used to protect multiple working line cards.

FIG. 15 shows an exemplary communication system 1500 in which a single PLC is used to protect multiple WLCs, as in the second example above. Because a single PLC is used to protect multiple WLCs, only WLC can be protected at any given time. In this example, a failure affecting communication with external device 1340 over slot 9 is bypassed by establishing a temporary bridge 1510 between slots 9 and E using the bridged routing table 1200. As long as the temporary bridge between slots 9 and E is active, failures affecting communication over slots 1, 5, and 7 cannot be protected using slot E.

Figure 16:
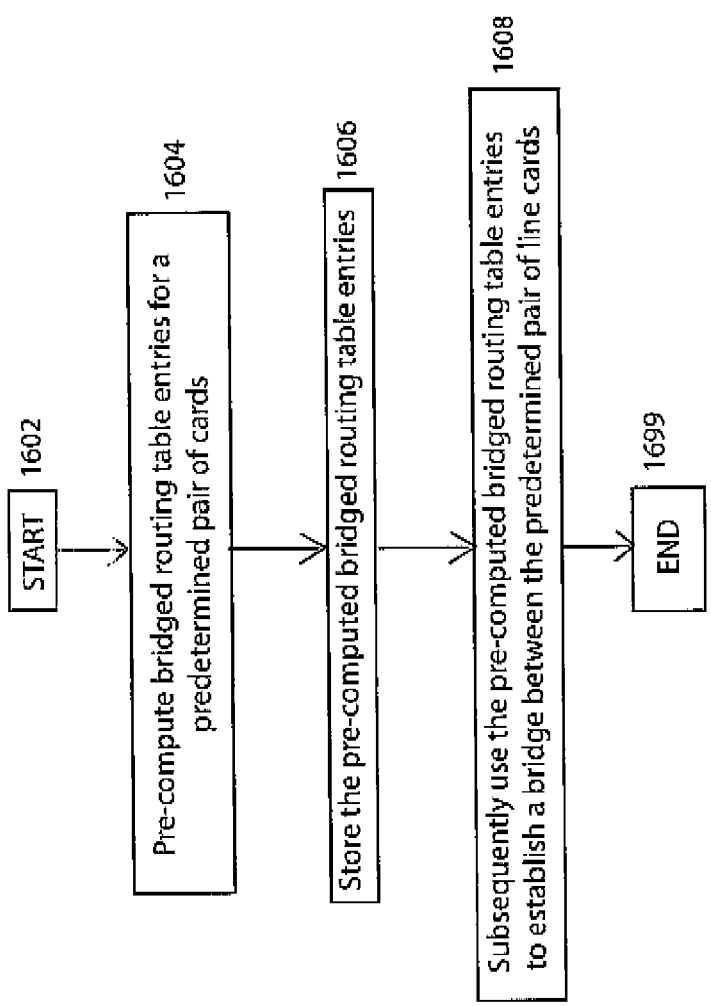
FIG. 16 is a logic flow diagram showing exemplary logic for quickly bridging a pair of line cards in accordance with an embodiment of the present invention.

FIG. 16 shows exemplary logic 1600 for quickly bridging a pair of line cards. Beginning in block 1602, the logic pre-computes bridged routing table entries for a predetermined pair of line cards, in block 1604. The logic typically stores the pre-computed bridged routing table entries, in block 1606. The logic subsequently uses the pre-computed bridged routing table entries to establish a bridge between the predetermined pair of line cards, in block 1608. The logic 1600 terminates in block 1699.

FIG. 17 shows exemplary logic 1700 for pre-computing a bridged routing table for a particular WLC/PLC pair. Beginning in block 1702, the logic obtains a routing table entry from the main routing table, in block 1704, and determines whether the routing table entry includes the WLC as an outgoing interface, in block 1706. If the routing table entry does not include the WLC as an outgoing interface (NO in block 1708), then the logic proceeds to block 1716. If the routing table entry does include the WLC as an outgoing interface (YES in block 1708), then the logic copies the routing table entry as a bridged routing table entry into the bridged routing table for the WLC/PLC pair, in block 1710, adds the PLC as an outgoing interface of the bridged routing table entry, in block 1712, creates a bridged routing vector identifying the slot ports for the PLC (corresponding to the slot ports for the WLC), in block 1714, and proceeds to block 1716. In block 1716, the logic determines whether there are any additional routing table entries in the main routing table. If there are additional routing table entries in the main routing table (YES in block 1716), then the logic recycles to block 1704 to process another routing table entry of the main routing table. If there are no additional routing table entries in the main routing table (NO in block 1716), then the logic terminates in block 1799.

FIG. 18 shows exemplary protection switching logic 1800 that uses a pre-computed bridged routing table. Beginning in block 1802, and upon detecting a failure affecting a WLC, in block 1804, the logic determines a PLC to back up the WLC, in block 1806. The logic then obtains a pre-computed bridged routing table for the WLC/PLC pair, in block 1808. It should be noted that there may be multiple bridged routing tables associated with a particular WLC, with each bridged routing table using a different PLC. After obtaining the bridged routing table for the WLC/PLC pair, in block 1808, the logic establishes a bridge between the WLC and the PLC using the pre-computed bridged routing table, in block 1810. Establishing the bridge may involve, among other things, distributing the pre-computed bridged routing table to all line cards. The logic 1800 terminates in block 1899.

It should be noted that, although various embodiments of the present invention are described with reference to multicast routes, the present invention is in no way limited to bridging multicast routes. The bridging mechanism described herein can be used for bridging of both unicast and multicast routes.

It should be noted that terms such as "switch" and "router" are used herein to describe various communication devices that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the logic for pre-computing bridged routing tables, storing the pre-computed bridged routing tables, and using the pre-computes bridged routing tables for protection switching or otherwise is implemented as a set of computer program instructions that is converted into a computer executable form, stored as such in a computer readable medium, and executed by a microprocessor within the networking device 100 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a method for bridging network traffic in a networking device having a plurality of communication interfaces such as line cards. The method involves creating a bridged routing entry for bridging a first communication interface and a second communication interface before requiring a bridge between the predetermined pair of communication interfaces, subsequently determining that a bridge is needed between the first communication interface and the second communication interface, and establishing the bridge between the first communication interface and the second communication interface using the bridged routing entry. Creating the bridged routing entry for bridging the first communication interface and the second communication interface involves adding the second communication interface as an outgoing interface to a routing entry having the first communication interface as an outgoing interface, and may also involve creating a bridged routing vector for bridging the first communication interface and the second communication interface. Determining that the bridge is needed between the first communication interface and the second communication interface typically involves detecting a failure affecting communication over the first communication interface.

The present invention may also be embodied as a method for bridging network traffic in a networking device having a plurality of communication interfaces such as line cards. The method involves creating a bridged routing table for bridging a first communication interface and a second communication interface before requiring a bridge between the predetermined pair of communication interfaces, subsequently determining that a bridge is needed between the first communication interface and the second communication interface, and establishing the bridge between the first communication interface and the second communication interface using the bridged routing table. Creating the bridged routing table for bridging the first communication interface and the second communication interface involves finding in a main routing table a number of main routing entries having the first communication interface as an outgoing interface and creating in the bridged routing table a corresponding bridged routing entry for each of said number of main routing entries, wherein each bridged routing entry includes all outgoing interfaces from its corresponding main routing entry and further includes the second communication interface as an outgoing interface. Creating a corresponding bridged routing entry for a main routing involves copying the main routing entry as a bridged routing entry into the bridged routing table and adding the second communication interface as an outgoing interface to the bridged routing entry, and may also involve creating a bridged routing vector for the bridged routing entry. Creating the corresponding bridged routing entry for the main routing entry involves including in the bridged routing entry a reference to the main routing entry in the main routing table. Determining that the bridge is needed between the first communication interface and the second communication interface typically involves detecting a failure affecting communication over the first communication interface.

The present invention may also be embodied as a method for protection switching in a networking device having a plurality of communication interfaces such as line cards. The method involves pre-establishing a bridged routing table for each of a number of communication interface pairs, where each communication interface pair represents a working communication interface and a corresponding protection communication interface from among the plurality of communication interfaces, detecting a failure affecting communication over a working communication interface, determining a protection communication interface to protect the working communication interface, obtaining the pre-established bridged routing table for the communication interface pair associated with the working communication interface and the protection communication interface, and bridging the protection communication interface to the working communication interface using the pre-established bridged routing table for the communication interface pair associated with the working communication interface and the protection communication interface. Pre-establishing a bridged routing table for a communication interface pair involves finding in a main routing table a number of main routing entries having the working communication interface as an outgoing interface and creating in the bridged routing table a corresponding bridged routing entry for each of said number of main routing entries, wherein each bridged routing entry includes all outgoing interfaces from its corresponding main routing entry and further includes the protection communication interface as an outgoing interface. Creating a corresponding bridged routing entry for a main routing entry involves copying the main routing entry as a bridged routing entry into the bridged routing table and adding the protection communication interface as an outgoing interface to the bridged routing entry, and may also involve creating a bridged routing vector for the bridged routing entry. Creating the corresponding bridged routing entry for the main routing entry involves including in the bridged routing entry a reference to the main routing entry in the main routing table.

The present invention may also be embodied as an apparatus having a plurality of communication interfaces such as line cards, bridge pre-establishment logic operably coupled to create a bridged routing entry for bridging a first communication interface and a second interface from among the plurality of communication interfaces before a bridge is needed between the first communication interface and the second interface, and bridge establishment logic operably coupled to establish a bridge between the first communication interface and the second communication interface using the pre-established bridged routing entry upon determining that a bridge is needed between the first communication interface and the second communication interface. The bridge pre-establishment logic is operably coupled to create the bridged routing entry by adding the second communication interface as an outgoing interface to a routing entry having the first communication interface as an outgoing interface. The bridge pre-establishment logic may also be operably coupled to create a bridged routing vector for bridging the first communication interface and the second communication interface. The bridge establishment logic is operably coupled to establish the bridge upon detecting a failure affecting communication over the first communication interface.

The present invention may also be embodied as a computer program for controlling a computer system. The computer program includes bridge pre-establishment logic programmed to create a bridged routing entry for bridging a first communication interface and a second interface from among a plurality of communication interfaces before a bridge is needed between the first communication interface and the second interface and bridge establishment logic programmed to establish a bridge between the first communication interface and the second communication interface using the pre-established bridged routing entry upon determining that a bridge is needed between the first communication interface and the second communication interface. The bridge pre-establishment logic is programmed to create the bridged routing entry by adding the second communication interface as an outgoing interface to a routing entry having the first communication interface as an outgoing interface. The bridge pre-establishment logic may also be programmed to create a bridged routing vector for bridging the first communication interface and the second communication interface. The bridge establishment logic is programmed to establish the bridge upon detecting a failure affecting communication over the first communication interface. The computer program may be embodied in a computer readable medium or in a data signal.

The present invention may also be embodied as an apparatus having a plurality of communication interfaces such as line cards, bridge pre-establishment logic operably coupled to create a bridged routing table for bridging a first communication interface and a second interface from among a plurality of communication interfaces before a bridge is needed between the first communication interface and the second interface, and bridge establishment logic operably coupled to establish a bridge between the first communication interface and the second communication interface using the pre-established bridged routing table upon determining that a bridge is needed between the first communication interface and the second communication interface. The bridge pre-establishment logic is operably coupled to create the bridged routing table by finding in a main routing table a number of main routing entries having the first communication interface as an outgoing interface and creating in the bridged routing table a corresponding bridged routing entry for each of said number of main routing entries, wherein each bridged routing entry includes all outgoing interfaces from its corresponding main routing entry and further includes the second communication interface as an outgoing interface. The bridge pre-establishment logic is operably coupled to create a corresponding bridged routing entry for a main routing entry by copying the main routing entry as a bridged routing entry into the bridged routing table and adding the second communication interface as an outgoing interface to the bridged routing entry. The bridge pre-establishment logic may also be operably coupled to create a bridged routing vector for the bridged routing entry. The bridge pre-establishment logic is operably coupled to include in the bridged routing entry a reference to the main routing entry in the main routing table. The bridge establishment logic is operably coupled to establish the bridge upon detecting a failure affecting communication over the first communication interface.

The present invention may also be embodied as a computer program for controlling a computer system. The computer program includes bridge pre-establishment logic programmed to create a bridged routing table for bridging a first communication interface and a second interface from among a plurality of communication interfaces before a bridge is needed between the first communication interface and the second interface and bridge establishment logic programmed to establish a bridge between the first communication interface and the second communication interface using the pre-established bridged routing table upon determining that a bridge is needed between the first communication interface and the second communication interface. The bridge pre-establishment logic is programmed to create the bridged routing table by finding in a main routing table a number of main routing entries having the first communication interface as an outgoing interface and creating in the bridged routing table a corresponding bridged routing entry for each of said number of main routing entries, wherein each bridged routing entry includes all outgoing interfaces from its corresponding main routing entry and further includes the second communication interface as an outgoing interface. The bridge pre-establishment logic is programmed to create a corresponding bridged routing entry for a main routing entry by copying the main routing entry as a bridged routing entry into the bridged routing table and adding the second communication interface as an outgoing interface to the bridged routing entry. The bridge pre-establishment logic may also be programmed to create a bridged routing vector for the bridged routing entry. The bridge pre-establishment logic is programmed to include in the bridged routing entry a reference to the main routing entry in the main routing table. The bridge establishment logic is programmed to establish the bridge upon detecting a failure affecting communication over the first communication interface. The computer program may be embodied in a computer readable medium or in a data signal.

The present invention may also be embodied as an apparatus having a plurality of communication interfaces such as line cards, bridge pre-establishment logic operably coupled to create a bridged routing table for each of a number of communication interface pairs, where each communication interface pair represents a working communication interface and a corresponding protection communication interface from among the plurality of communication interfaces, and bridge establishment logic operably coupled to establish a bridge between a working communication interface and a corresponding protection communication interface using the bridged routing table associated with the working communication interface and corresponding protection communication interface upon detecting a failure affecting communication over the working communication interface. The bridge pre-establishment logic is operably coupled to create a bridged routing table for a communication interface pair by finding in a main routing table a number of main routing entries having the working communication interface as an outgoing interface and creating in the bridged routing table a corresponding bridged routing entry for each of said number of main routing entries, wherein each bridged routing entry includes all outgoing interfaces from its corresponding main routing entry and further includes the protection communication interface as an outgoing interface. The bridge pre-establishment logic is operably coupled to create a corresponding bridged routing entry for a main routing entry by copying the main routing entry as a bridged routing entry into the bridged routing table and adding the protection communication interface as an outgoing interface to the bridged routing entry. The bridge pre-establishment logic may also be operably coupled to create a bridged routing vector for the bridged routing entry. The bridge pre-establishment logic is operably coupled to include in the bridged routing entry a reference to the main routing entry in the main routing table.

The present invention may also be embodied as a computer program for controlling a computer system. The computer program includes bridge pre-establishment logic programmed to create a bridged routing table for each of a number of communication interface pairs, where each communication interface pair represents a working communication interface and a corresponding protection communication interface from among the plurality of communication interfaces and bridge establishment logic programmed to establish a bridge between a working communication interface and a corresponding protection communication interface using the bridged routing table associated with the working communication interface and corresponding protection communication interface upon detecting a failure affecting communication over the working communication interface. The bridge pre-establishment logic is programmed to create a bridged routing table for a communication interface pair by finding in a main routing table a number of main routing entries having the working communication interface as an outgoing interface and creating in the bridged routing table a corresponding bridged routing entry for each of said number of main routing entries, wherein each bridged routing entry includes all outgoing interfaces from its corresponding main routing entry and further includes the protection communication interface as an outgoing interface. The bridge pre-establishment logic is programmed to create a corresponding bridged routing entry for a main routing entry by copying the main routing entry as a bridged routing entry into the bridged routing table and adding the protection communication interface as an outgoing interface to the bridged routing entry. The bridge pre-establishment logic may also be programmed to create a bridged routing vector for the bridged routing entry. The bridge pre-establishment logic is programmed to include in the bridged routing entry a reference to the main routing entry in the main routing table. The computer program may be embodied in a computer readable medium or in a data signal.

The present invention may be embodied in other specific forms without departing from the true scope of the inven-

I claim:

1. A method for bridging network traffic in a networking device having a plurality of communication interfaces, the method comprising:

creating a bridged routing table separate from a main routing table, the main routing table for routing network traffic, the bridged routing table for bridging the network traffic over both a first communication interface and a second communication interface before requiring a bridge between the predetermined pair of communication interfaces;

subsequently determining that a bridge is needed between the first communication interface and the second communication interface; and establishing the bridge between the first communication interface and the second communication interface using the bridged routing table, wherein creating the bridged routine table for bridging the first communication interface and the second communication interface comprises:

finding, in the main routing table, a number of main routing entries having the first communication interface as an outgoing interface; and creating in the bridged routing table a corresponding bridged routing entry for each of said number of main routing entries, wherein each bridged routing entry includes all outing interfaces from its corresponding main routing entry and further includes the second communication interface as an outgoing interface.

2. The method of claim 1, wherein creating a corresponding bridged routing entry for a main routing entry comprises:

copying the main routing entry as a bridged routing entry into the bridged routing table; and adding the second communication interface as an outgoing interface to the bridged routing entry.

3. The method of claim 2, wherein creating the corresponding bridged routing entry for the main routing entry comprises:

creating a bridged routing vector for the bridged routing entry.

4. The method of claim 2, wherein creating the corresponding bridged routing entry for the main routing entry comprises;

including in the bridged routing entry a reference to the main routing entry in the main routing table.

5. The method of claim 1, wherein determining that the bridge is needed between the first communication interface and the second communication interface comprises:

detecting a failure affecting communication over the first communication interface.

6. The method of claim 1, wherein the plurality of communication interfaces comprises a plurality of line cards.

7. A method for protection switching in a networking device having a plurality of communication interfaces, the method comprising:

pre-establishing a bridged routing table separate from a main routing table, the main routing table for routing network traffic, the bridged routing table for bridging the network traffic over each communication interface in each of a number of communication interface pairs, where each communication interface pair represents a working communication interface and a corresponding protection communication interface from among the plurality of communication interfaces;

detecting a failure affecting communication over a working communication interface;

determining a protection communication interface to protect the working communication interface;

obtaining the pre-established bridged routing table for the communication interface pair associated with the working communication interface and the protection communication interface; and bridging the protection communication interface to the working communication interface using the pre-established bridged routing table for the communication interface pair associated with the working communication interface and the protection communication interface, wherein pre-establishing a bridged routing table for a communication interface pair comprises:

finding in the main routing table a number of main routing entries having the working communication interface as an outgoing interface; and creating in the bridged routing table a corresponding bridged routing entry for each of said number of main routing entries, wherein each bridged routing entry includes all outgoing interfaces from its corresponding main routing entry and further includes the protection communication interface as an outgoing interface.

8. The method of claim 7, wherein creating a corresponding bridged routing entry for a main routing entry comprises:

copying the main routing entry as a bridged routing entry into the bridged routing table; and adding the protection communication interface as an outgoing interface to the bridged routing entry.

9. The method of claim 8, wherein creating the corresponding bridged routing entry for the main routing entry comprises;

creating a bridged routing vector for the bridged routing entry.

10. The method of claim 8, wherein creating the corresponding bridged routing entry for the main routing entry comprises:

including in the bridged routing entry a reference to the main routing entry in the main routing table.

11. The method of claim 7, wherein the plurality of communication interfaces comprises a plurality of line cards.

12. An apparatus comprising:

a plurality of communication interfaces;

bridge pre-establishment logic operably coupled to create a bridged routing table separate from a main routing table, the main routing table for routing network traffic, the bridged routing table for bridging the network traffic over both a first communication interface and a second interface from among a plurality of communication interfaces before a bridge is needed between the first communication interface and the second interface; and bridge establishment logic operably coupled to establish a bridge between the first communication interface and the second communication interface using the pre-established bridged routing table upon determining that a bridge is needed between the first communication interface and the second communication interface, wherein the bridge pre-establishment logic is operably coupled to create the bridged routing table finding, in the main routing table, a number of main routing entries having the first communication interface as an outgoing interface and creating in the bridged routing table a corresponding bridged routing entry for each of said number of main routing entries, wherein each bridged routing entry includes all outgoing interfaces from its corresponding main routing entry and further includes the second communication interface as an outgoing interface.

13. The apparatus of claim 12, wherein the bridge pre-establishment logic is operably coupled to create a corresponding bridged routing entry for a main routing entry by copying the main routing entry as a bridged routing entry into the bridged routing table and adding the second communication interface as an outgoing interface to the bridged routing entry.

14. The apparatus of claim 13, wherein the bridge pre-establishment logic is operably coupled to create a bridged routing vector for the bridged routing entry.

15. The apparatus of claim 13, wherein the bridge pre-establishment logic is operably coupled to include in the bridged routing entry a reference to the main routing entry in the main routing table.

16. The apparatus of claim 12, wherein the bridge establishment logic is operably coupled to establish the bridge upon detecting a failure affecting communication over the first communication interface.

17. The apparatus of claim 12, wherein the plurality of communication interfaces comprises a plurality of line cards.

18. A computer readable medium having embodied therein a computer program to be executed by a processor comprising:
bridge pre-establishment logic programmed to create a bridged routing table separate from a main routing table, the main routing table for routing network traffic, the bridged routing table for bridging the network traffic over both a first communication interface and a second interface from among a plurality of communication interfaces before a bridge is needed between the first communication interface and the second interface; and
bridge establishment logic programmed to establish a bridge between the fist communication interface and the second communication interface using the pre-established bridged routing table upon determining that a bridge is needed between the first communication interface and the second communication interface,
wherein the bridge pre-establishment logic is programmed to create the bridged routing table by finding in the main routing table a number of main routing entries having the first communication interface as an outgoing interface and creating in the bridged routing table a corresponding bridged routing entry for each of said number of main routing entries, wherein each bridged routing entry includes all outgoing interfaces from its corresponding main routing entry and further includes the second communication interface as an outgoing interface.

19. The computer readable medium of claim 18, wherein the bridge pre-establishment logic is programmed to create a corresponding bridged routing entry for a main routing entry by copying the main routing entry as a bridged routing entry into the bridged routing table and adding the second communication interface as an outgoing interface to the bridged routing entry.

20. The computer readable medium of claim 19, wherein the bridge pre-establishment logic is programmed to create a bridged routing vector for the bridged routing entry.

21. The computer readable medium of claim 19, wherein the bridge pre-establishment logic is programmed to include in the bridged routing entry a reference to the main routing entry in the main routing table.

22. The computer readable medium of claim 18, wherein the bridge establishment logic is programmed to establish the bridge upon detecting a failure affecting communication over the first communication interface.

23. The computer readable medium of claim 18 embodied in a computer readable medium.

24. An apparatus comprising:
a plurality of communication interfaces;
bridge pre-establishment logic operably coupled to create a bridged routing table separate from a main routing table, the main routing table for routing network traffic, the bridged routing table for bridging the network traffic over each communication interface of a number of communication interface pairs, where each communication interface pair represents a working communication interface and a corresponding protection communication interface from among the plurality of communication interfaces; and
bridge establishment logic operably coupled to establish a bridge between a working communication interface and a corresponding protection communication interface using the bridged routing table associated with the working communication interface and corresponding protection communication interface upon detecting a failure affecting communication over the working communication interface,
wherein the bridge pre-establishment logic is operably coupled to create a bridged routing table for a communication interface pair by finding in the main routing table a number of main routing entries having the working communication interface as an outgo interface and creating in the bridged routing table a corresponding bridged routing entry for each of said number of main routing entries, wherein each bridged routing entry includes all outgoing interfaces from its corresponding main routing entry and further includes the protection communication interface as an outgoing interface.

25. The apparatus of claim 24, wherein the bridge pre-establishment logic is operably coupled to create a corresponding bridged routing entry for a main routing entry by copying the main routing entry as a bridged routing entry into the bridged routing table and adding the protection communication interface as an outgoing interface to the bridged routing entry.

26. The apparatus of claim 25, wherein the bridge pre-establishment logic is operably coupled to create a bridged routing vector for the bridged routing entry.

27. The apparatus of claim 25, wherein the bridge pre-establish logic is operably coupled to include in the bridged routing entry a reference to the main routing entry in the main routing table.

28. The apparatus of claim 24, wherein the plurality of communication interfaces comprises a plurality of line cards.

29. A computer readable medium having embodied therein a computer program to be executed by a processor comprising:
bridge pre-establishment logic programmed to create a bridged routing table separate from a main routing table, the main routing table for routing network traffic, the bridged routing table for bridging the network traffic over each communication interface of a number of communication interface pairs, where each communication interface pair represents a working communication interface and a corresponding protection communication interface from among the plurality of communication interfaces; and bridge establishment logic programmed to establish a bridge between a working communication interface and a corresponding protection communication interface using the bridged routing table associated with the working communication interface and corresponding protection communication interface upon detecting a failure affecting communication over the working communication interface, wherein the bridge pre-establishment logic is programmed to create a bridged routing table for a communication interface pair by finding in the main routing table a number of main routing entries having the working communication interface as an outgoing interface and creating in the bridged routing table a corresponding bridged routing entry for each of said number of main routing entries, wherein each bridged routing entry includes all outgoing interfaces from its corresponding main routing entry and further includes the protection communication interface as an outgoing interface.

30. The computer readable medium of claim 29, wherein the bridge pre-establishment logic is programmed to create a corresponding bridged routing entry for a main routing entry by copying the main routing entry as a bridged routing entry into the bridged routing table and adding the protection communication interface as an outgoing interface to the bridged routing entry.

31. The computer readable medium of claim 30, wherein the bridge pre-establishment logic is programmed to create a bridged routing vector for the bridged routing entry.

32. The computer readable medium of claim 30, wherein the bridge pre-establishment logic is programmed to include in the bridged routing entry a reference to the main routing entry in the main routing table.

33. The computer readable medium of claim 29 embodied in a computer readable medium.

* * * * *